US010703055B2

(12) United States Patent
Robins et al.

(10) Patent No.: US 10,703,055 B2
(45) Date of Patent: Jul. 7, 2020

(54) CLAMPING SYSTEM FOR HOLDING A COMPOSITE CHARGE DURING FORMING OVER A FORMING MANDREL

(71) Applicants: The Boeing Company, Chicago, IL (US); Applus Servicios Tecnologicos, Barcelona (ES)

(72) Inventors: Brian G. Robins, Renton, WA (US); Derek Willis, Edmonds, WA (US); Jordi Brufau Redondo, Barcelona (ES); Maria Clemencia Corzo Rueda, Barcelona (ES)

(73) Assignees: The Boeing Company, Chicago, IL (US); Applus Servicios Tecnologicos, Barcelona (ES)

( * ) Notice: Subject to any disclaimer, the term of this patent is extended or adjusted under 35 U.S.C. 154(b) by 339 days.

(21) Appl. No.: 15/649,646

(22) Filed: Jul. 14, 2017

(65) Prior Publication Data

US 2019/0016069 A1 Jan. 17, 2019

(51) Int. Cl.
*B29C 70/54* (2006.01)
*B29C 70/52* (2006.01)
(Continued)

(52) U.S. Cl.
CPC ............ *B29C 70/541* (2013.01); *B25B 5/067* (2013.01); *B29C 53/82* (2013.01); *B29C 70/34* (2013.01);
(Continued)

(58) Field of Classification Search
CPC .......... B29C 2053/8025; B29C 70/541; B29C 53/82; B29C 70/56; B29C 51/12;
(Continued)

(56) References Cited

U.S. PATENT DOCUMENTS 1,186,288 A * 6/1916 Cunningham ............ E05D 3/02
16/390
1,463,783 A * 8/1923 Allen ........................ A47H 1/02
16/343
(Continued)

FOREIGN PATENT DOCUMENTS

DE 102012019958 4/2013
EP 2995443 3/2016
(Continued)

OTHER PUBLICATIONS

Dykes: "Roll forming continuous fibre-reinforced thermoplastic sheets: experimental analysis," Composites Part A: Applied Science and Manufacturing, Elsevier, Amsterdam, NL, vol. 31, No. 12, Dec. 1, 2000 (Dec. 1, 2000), pp. 1395-1407.
(Continued)

*Primary Examiner* — Matthew J Daniels

(57) ABSTRACT

A clamping system for securing a composite charge in position relative to a forming mandrel includes an upstream hinge clamp and a downstream hinge clamp for clamping opposing ends of the composite charge in respective position relative to a mandrel upstream end and a mandrel downstream end during forming of the composite charge onto the forming mandrel. Each one of the hinge clamps is configured to fold a corresponding end of the composite charge from a generally approximately flat configuration to an angled configuration during forming of the composite charge onto the forming mandrel. At least one of the hinge axes is oriented approximately parallel to a folding axis located proximate an intersection of a mandrel top portion with at least one of opposing mandrel side surfaces.

20 Claims, 20 Drawing Sheets

(51) Int. Cl.
  *B29C 70/56* (2006.01)
  *B29C 70/34* (2006.01)
  *B25B 5/06* (2006.01)
  *B29C 53/82* (2006.01)
  *B64F 5/50* (2017.01)
  *B64C 1/06* (2006.01)
  *B64C 3/18* (2006.01)

(52) U.S. Cl.
  CPC ............ *B29C 70/525* (2013.01); *B29C 70/56* (2013.01); *B64F 5/50* (2017.01); *B64C 1/064* (2013.01); *B64C 3/182* (2013.01)

(58) Field of Classification Search
  CPC ......... B29C 51/262; B25B 5/14; B25B 5/103; E05D 15/264; E05Y 2800/672; Y10T 16/53836; Y10T 16/5353
  See application file for complete search history.

(56) References Cited

U.S. PATENT DOCUMENTS

| | | | | |
|---|---|---|---|---|
| 2,968,064 A * | 1/1961 | Howell | ................ | B29C 51/262 425/388 |
| 3,102,186 A | 8/1963 | Owers | | |
| 3,655,320 A * | 4/1972 | Heavener | ................ | B29C 51/00 425/388 |
| 3,846,868 A * | 11/1974 | Brydolf | ................ | E05F 1/1269 16/255 |
| 5,167,742 A | 1/1992 | Peters | | |
| 5,648,109 A | 7/1997 | Gutowski | | |
| 2009/0130450 A1 | 5/2009 | Anderson | | |
| 2012/0256348 A1 | 10/2012 | Bergmann | | |
| 2014/0131914 A1 | 5/2014 | Gottinger | | |
| 2014/0190625 A1 | 7/2014 | Buttrick | | |
| 2014/0290866 A1 | 10/2014 | Brufau Redondo | | |
| 2014/0314996 A1 | 10/2014 | Stewart | | |
| 2015/0151507 A1 * | 6/2015 | Edelmann | ................ | B32B 5/02 428/164 |
| 2016/0082675 A1 | 3/2016 | Brufau Redondo | | |
| 2017/0021534 A1 | 2/2017 | Chapman et al. | | |

FOREIGN PATENT DOCUMENTS

| | | |
|---|---|---|
| EP | 3015258 | 4/2016 |
| WO | WO2004000656 | 3/2003 |
| WO | WO2014181003 | 11/2014 |

OTHER PUBLICATIONS

EPO, European Search Report for Appl. No. 18183442.5 dated Dec. 19, 2018.

* cited by examiner

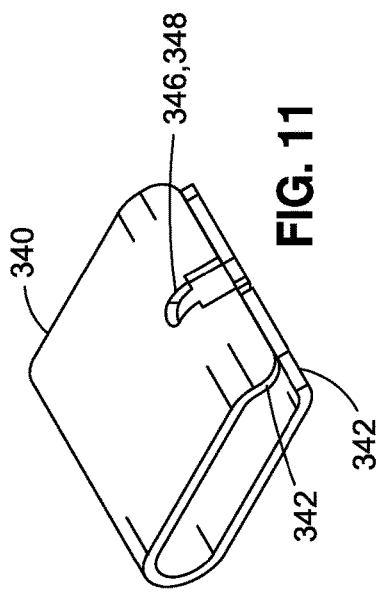
FIG. 11
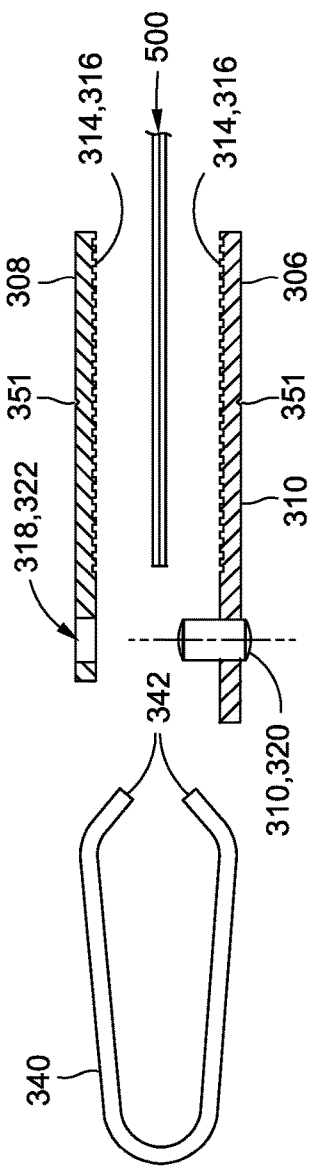
FIG. 10
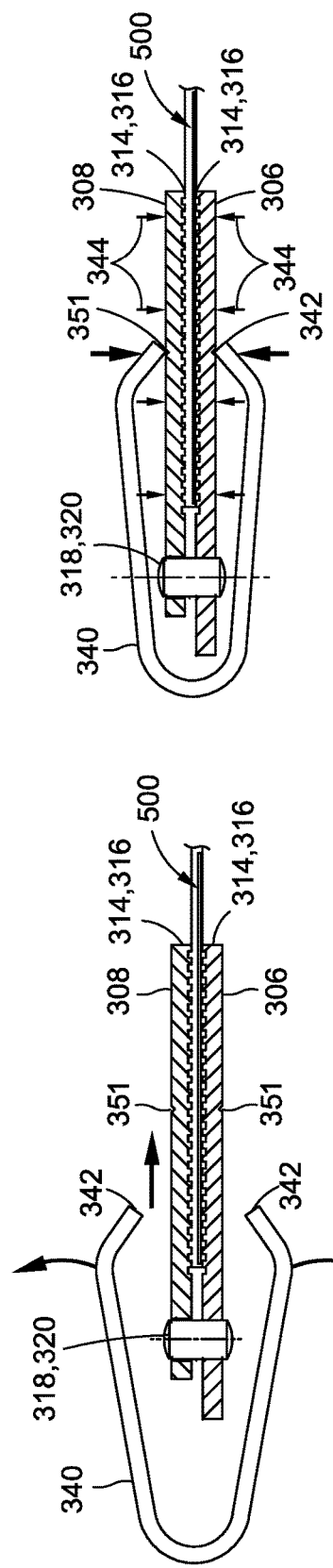
FIG. 13
FIG. 12

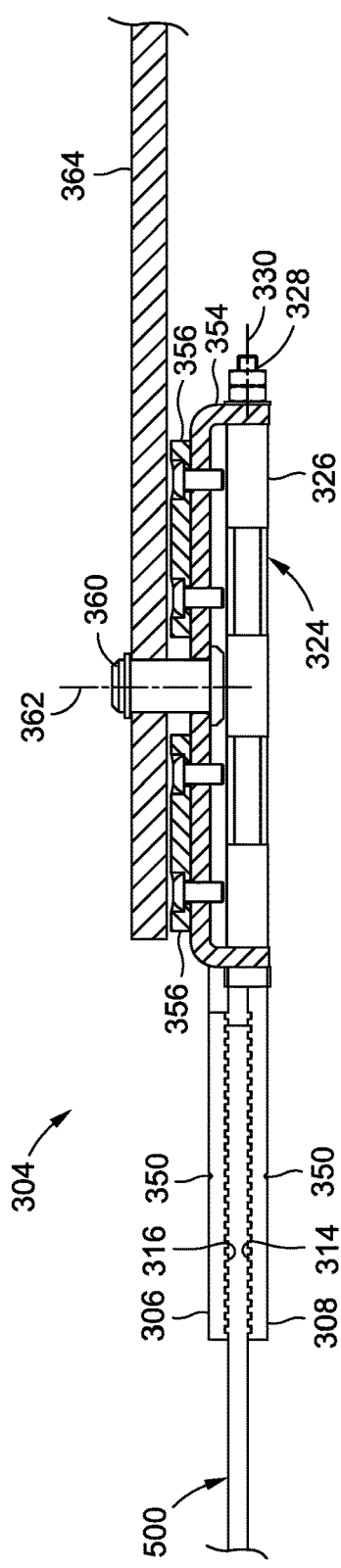
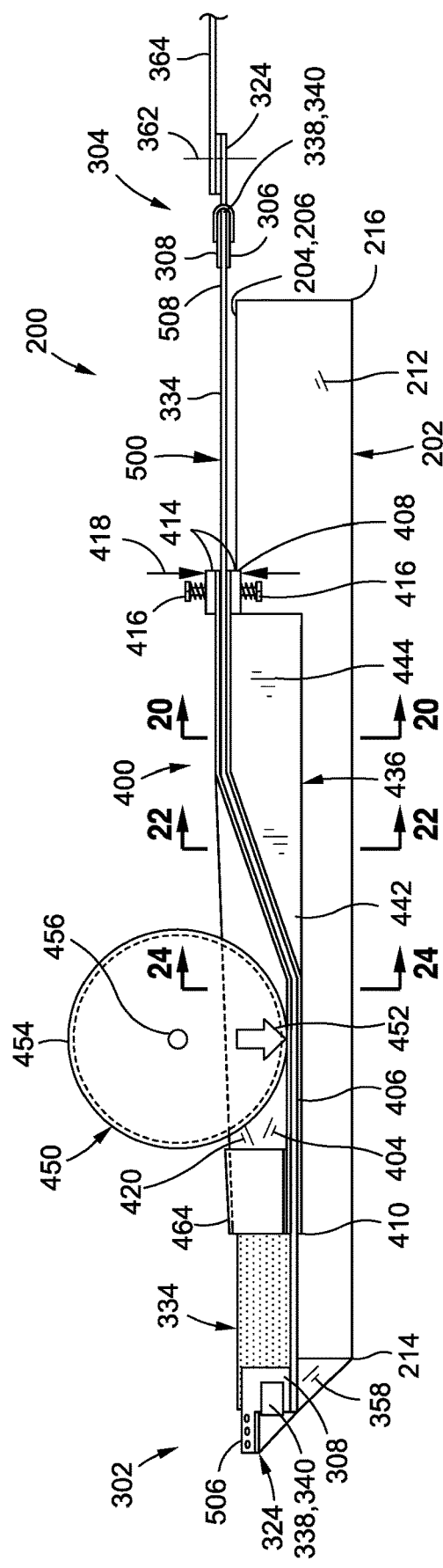
FIG. 18
FIG. 19

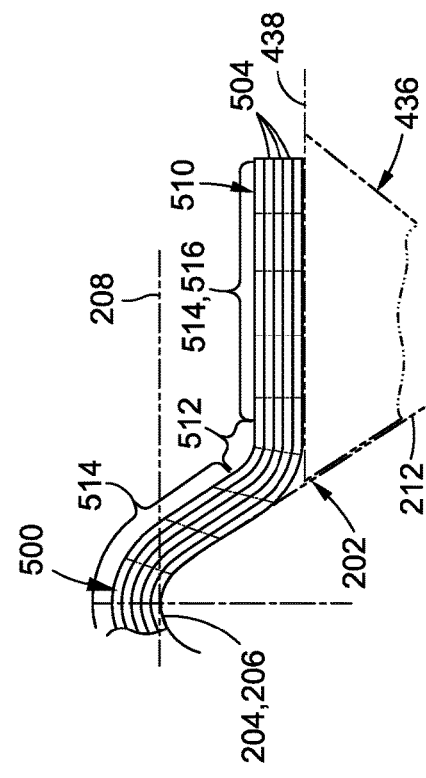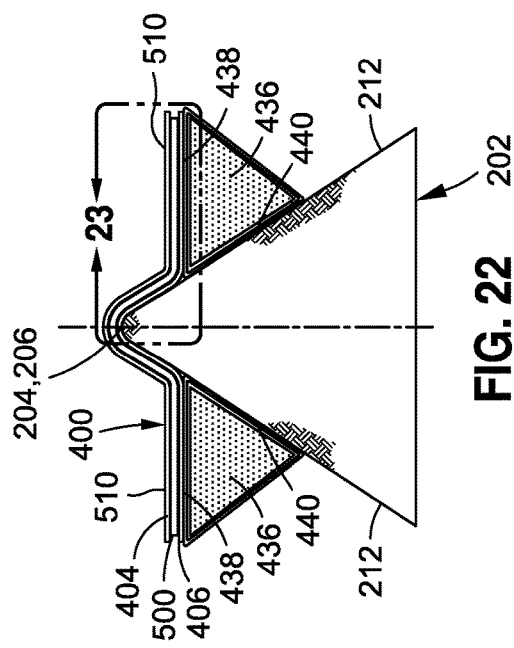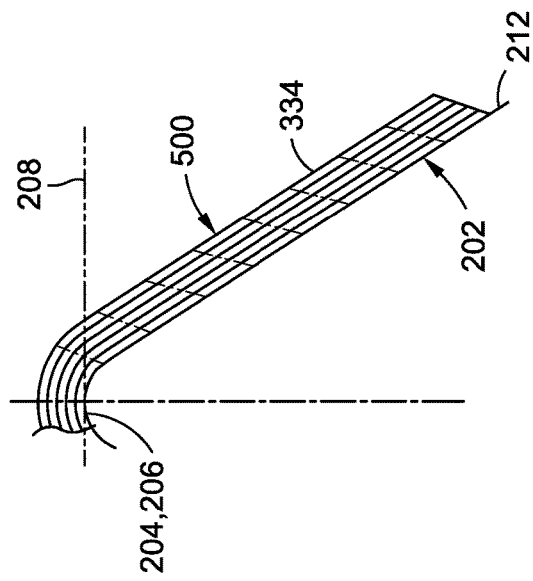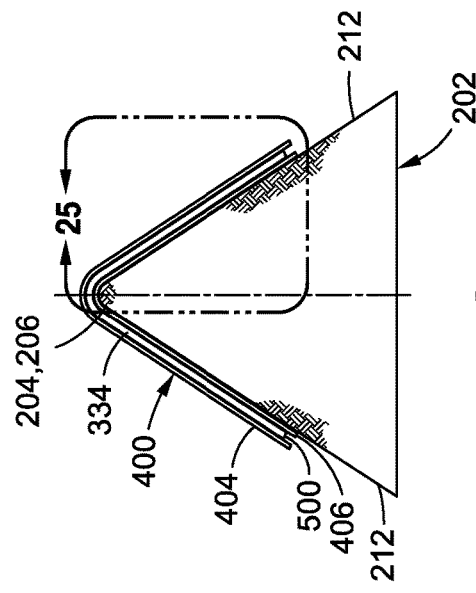

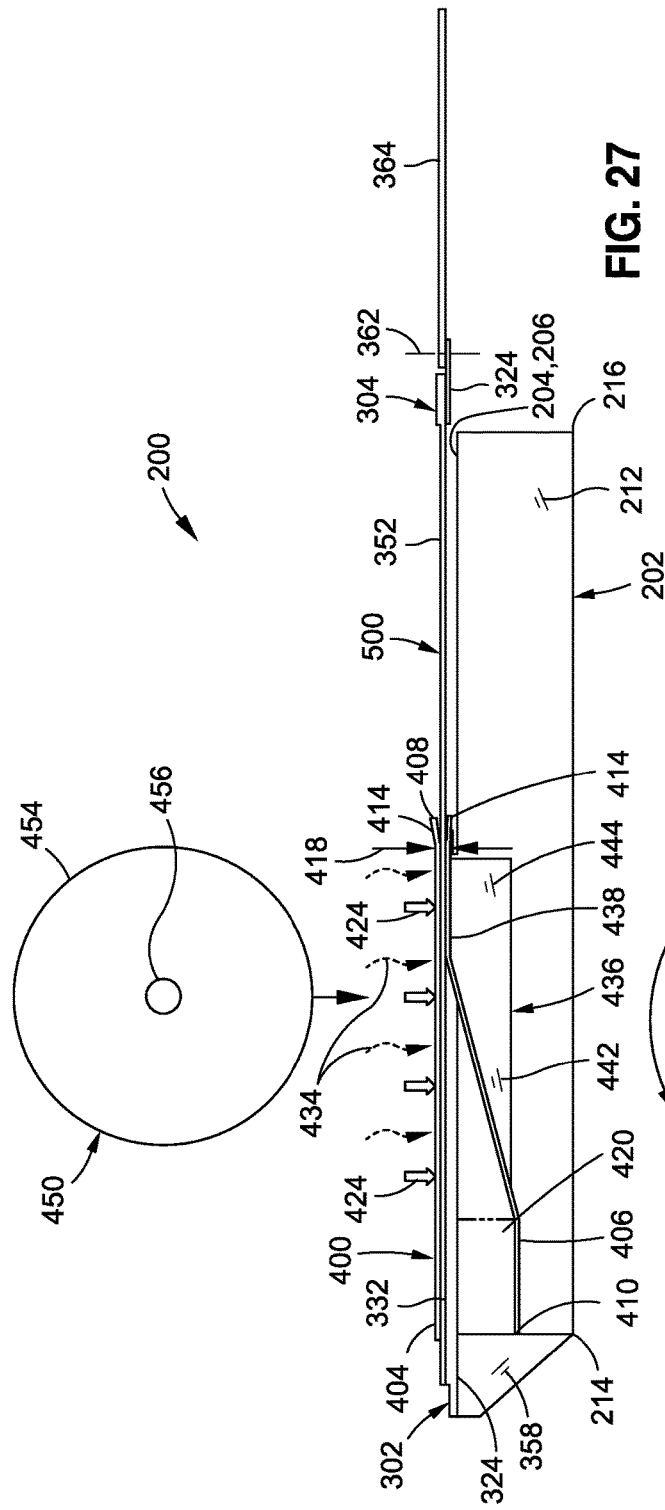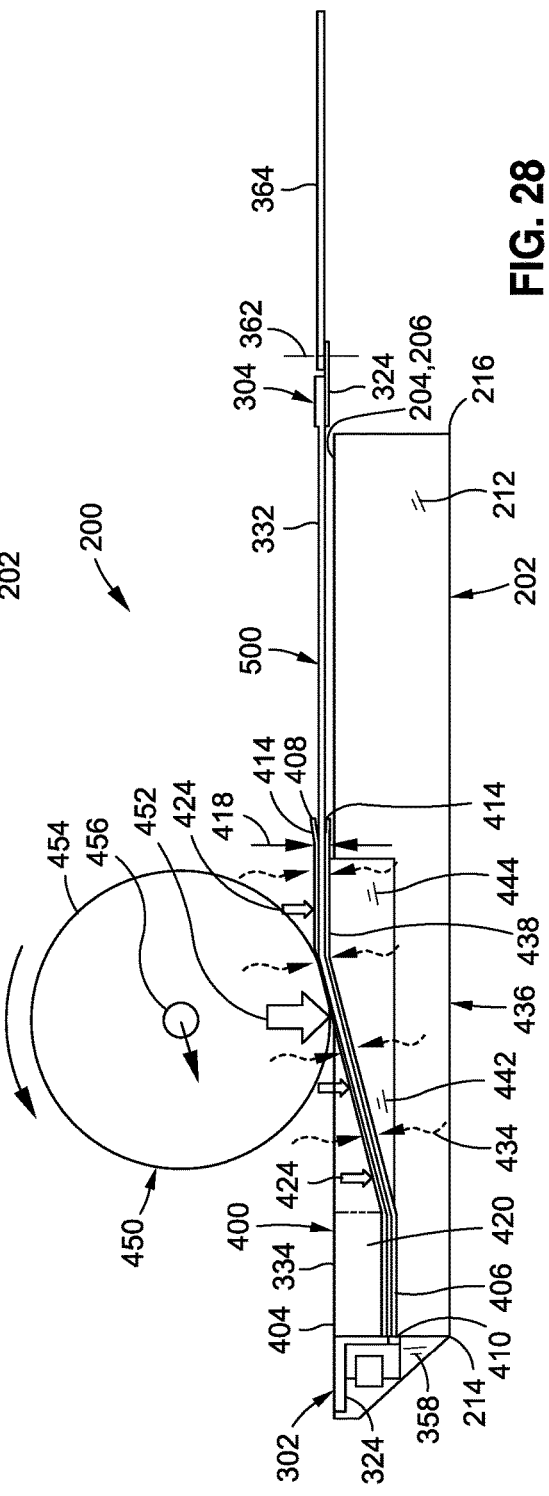

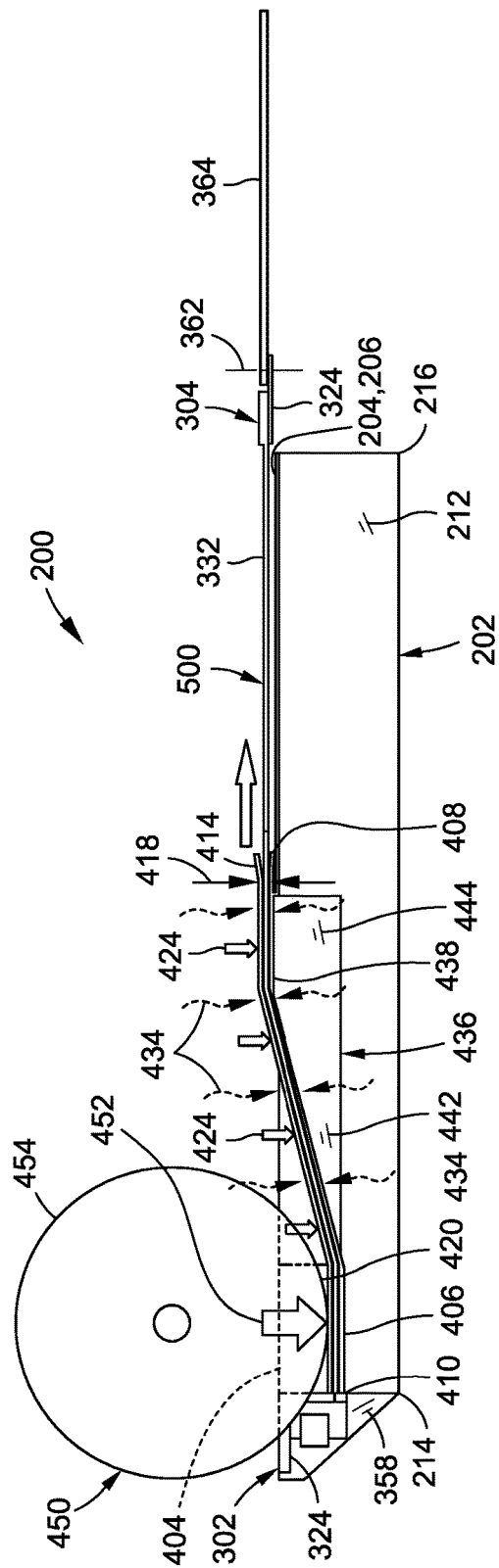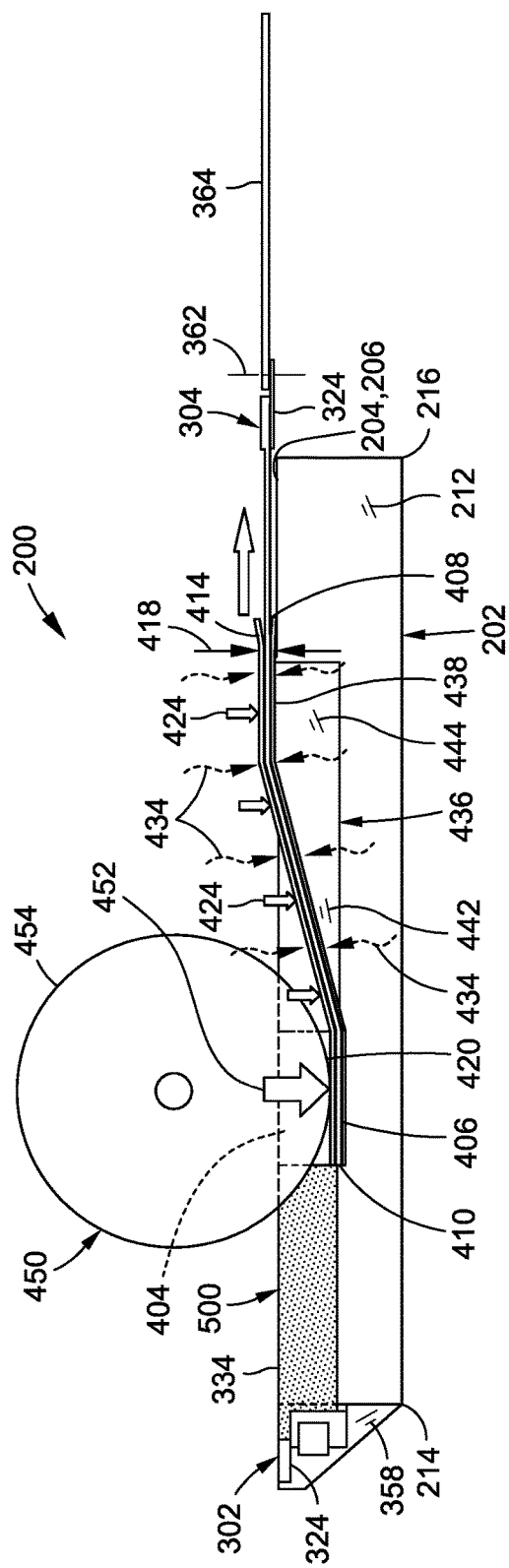

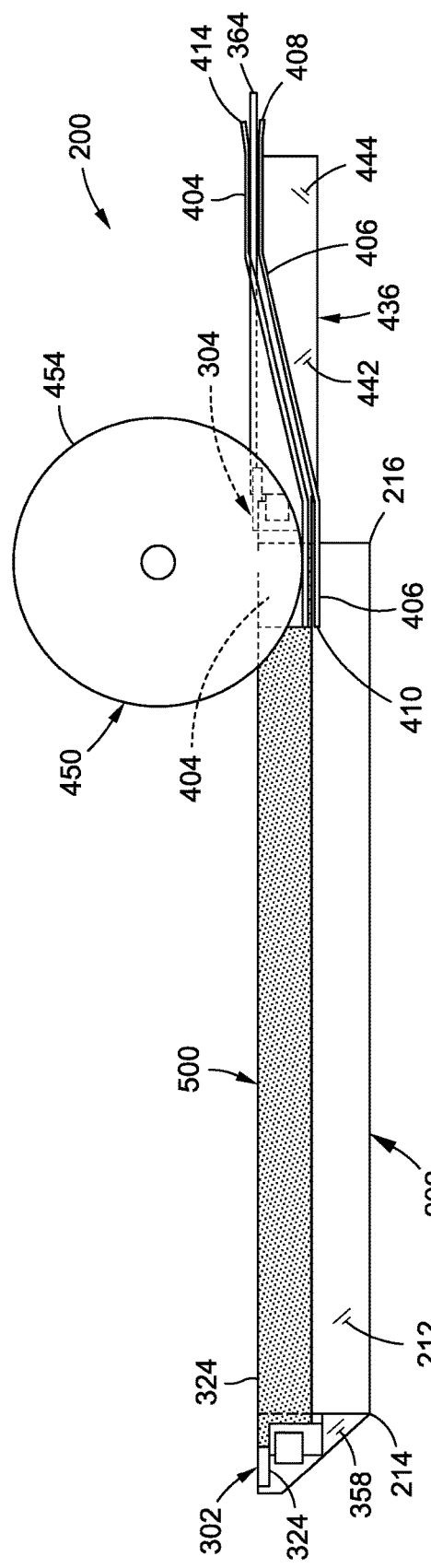
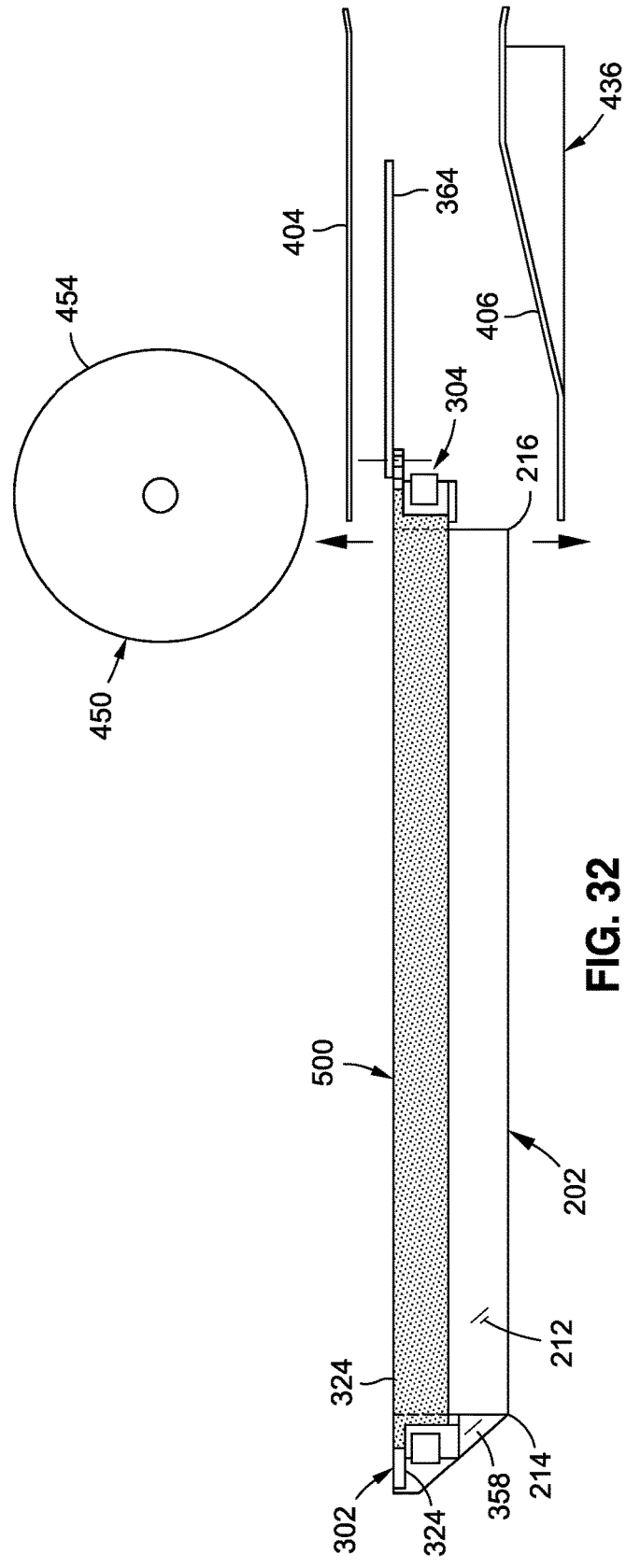
FIG. 31
FIG. 32

CLAMPING SYSTEM FOR HOLDING A COMPOSITE CHARGE DURING FORMING OVER A FORMING MANDREL

FIELD

The present disclosure relates generally to composites manufacturing and, more particularly, to a clamping system for holding a composite charge during forming over a forming mandrel.

BACKGROUND

Composite materials are increasingly used in structural applications due to the high strength-to-weight ratio provided by composite structures. For example, in aircraft construction, composite materials are used in increasing quantities to form the fuselage, wings, vertical fin, horizontal stabilizer, and other components. A wing panel may be produced by co-curing or co-bonding a plurality of elongated composite stringers to a composite wing skin. The process of fabricating each composite stringer may include laying up a stack of uncured composite plies to form a composite charge which may have an approximately flat configuration. Each composite ply may be comprised of reinforcing fibers (e.g., carbon fibers) impregnated with polymer matrix material (e.g., epoxy resin). After layup, the composite charge may be formed over an elongated forming mandrel so that the composite charge assumes an angled configuration corresponding to the cross-sectional shape of the forming mandrel. After forming, the composite charge may be co-cured or co-bonded with other composite parts such as a composite skin.

During forming of the composite charge over an elongated forming mandrel, the opposing ends of the composite charge must be accurately held in position relative to the respective opposing ends of the forming mandrel. In addition, lengthwise tension must be applied to the composite charge during the forming process to reduce or prevent the formation of wrinkles in the composite charge. The lengthwise tension must be continuously applied as the composite charge transitions from an approximately flat configuration to an angled configuration. Furthermore, the composite charge is preferably maintained in centered relation to the forming mandrel during the forming process. After forming, the composite charge must be easily removable from the forming mandrel to allow for high production rates. The above-noted requirements are not understood to be available in known forming systems.

As can be seen, there exists a need in the art for a system and method for accurately holding a composite charge in position relative to a forming mandrel in a manner that allows for the continuous application of lengthwise tension in the composite charge during transition from a flat configuration to an angled configuration, and which preferably provides a means for keeping the composite charge centered over the forming mandrel and which allows for easy removal of the composite charge after forming.

SUMMARY

The above-noted needs associated with forming a composite charge over a forming mandrel are specifically addressed and alleviated by the present disclosure which provides a clamping system for securing a composite charge in position relative to a forming mandrel. The clamping system includes an upstream hinge clamp and a downstream hinge clamp configured to respectively clamp and hold opposing ends of the composite charge in respective position relative to a mandrel upstream end and a mandrel downstream end during forming of the composite charge over the forming mandrel using a blanket assembly through which the composite charge slides during translation of the blanket assembly along the forming mandrel. Each one of the hinge clamps is configured to fold a corresponding end of the composite charge about a hinge axis from a generally approximately flat configuration to an angled configuration during forming of the composite charge onto the forming mandrel.

Also disclosed is a forming system for forming a composite charge onto a forming mandrel. The forming system includes a forming mandrel having a mandrel upstream end, a mandrel downstream end, and opposing mandrel side surfaces interconnected by a mandrel top portion. In addition, the forming system includes an upstream hinge clamp and a downstream hinge clamp configured to respectively clamp and hold opposing ends of the composite charge in respective position relative to the mandrel upstream end and the mandrel downstream end during forming of the composite charge onto the forming mandrel using a blanket assembly through which the composite charge slides during translation of the blanket assembly along a lengthwise direction of the forming mandrel. The hinge clamps are configured to fold the hinge clamp and a corresponding end of the composite charge about at least one hinge axis from a generally approximately flat configuration to an angled configuration during forming of the composite charge onto the forming mandrel. At least one of the hinge axes is oriented approximately parallel to a folding axis of the composite charge. The folding axis is located proximate an intersection of the mandrel top portion with at least one of the mandrel side surfaces.

Also disclosed is a method of forming a composite charge onto a forming mandrel. The method includes clamping at least one of opposing ends of a composite charge to a hinge clamp located at a mandrel end of a forming mandrel. In addition, the method includes forming the composite charge onto the forming mandrel, and folding the hinge clamp from an approximately flat configuration to an angled configuration during forming of the composite charge onto the forming mandrel.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 10 is a side view of a lower plate, an upper plate, and a spring clamp included with the upstream hinge clamp and the downstream hinge clamp;

FIG. 11 is a perspective view of an example of a spring clamp for mounting over the lower plate and the upper plate;

FIG. 12 is a side view of the lower plate and the upper plate assembled with the composite charge sandwiched therebetween prior to mounting the spring clamp;

FIG. 13 is a side view showing the spring clamp clamping the composite charge between the lower plate and the upper plate clamp;

FIG. 18 is a side view of the downstream hinge clamp coupled to a forward extension element for applying lengthwise tension to the composite charge during forming onto the forming mandrel;

FIG. 19 is a side view of the forming mandrel showing the upstream hinge clamp and composite charge in the angled configuration at the mandrel upstream end, and showing the downstream hinge clamp and composite charge in the approximately flat configuration;

FIG. 22 is a sectional view of the forming system taken along line 22 of FIG. 19 and illustrating a Z-shaped contour induced in each of laterally opposite sides of the composite charge due to the application of a blanket forming pressure applied to the composite charge by the upper heating blanket as the composite charge is progressively formed;

FIG. 23 is a magnified sectional view of one lateral side of the composite charge taken along line 23 of FIG. 22 and illustrating a laterally-outwardly-moving slipping zone located along a juncture of a mandrel side surface with a wedge element top side (blanket assembly omitted for clarity), and within which the composite plies that make up the composite charge interlaminarly slip relative to one another during translation of the blanket assembly along the forming mandrel, and further showing the wedge elements maintaining the laterally outboard portion of the composite charge in parallel relation (e.g., horizontal) to a level tangent to the mandrel top portion;

FIG. 24 is a sectional view of the forming system taken along line 24 of FIG. 19 and illustrating each lateral side of the composite charge conformed to the forming mandrel at a location aft of the tapered sections of the wedge elements;

FIG. 25 is a magnified sectional view of one lateral side of the composite charge taken along line 25 of FIG. 24 and illustrating the composite charge conformed to the mandrel side surface of the forming mandrel;

FIG. 27 is a side view of the forming system showing the blanket assembly and composite charge mounted on the forming mandrel prior to the application of a forming device onto the blanket assembly, and showing the upstream hinge clamp, the downstream hinge clamp, and the composite charge in the approximately flat configuration;

FIG. 28 is a side view of the forming system showing the forming device mounted on onto the blanket assembly at a forward end of the tapered section for initial progressive forming of the composite charge to the mandrel side surfaces and the wedge elements;

FIG. 29 is a side view of the forming system showing the forming device held stationary on the blanket aft extension and also showing the upstream hinge clamp and the composite charge in an angle configuration at the mandrel upstream end;

FIG. 30 is a side view of the forming system showing the blanket assembly and forming device being translated as a unit toward the mandrel downstream end while lengthwise tension is applied to the charge downstream end during the progressive forming of the composite charge to the cross-sectional shape of the forming mandrel;

FIG. 31 is a side view of the forming system showing the blanket assembly and forming device located at the mandrel downstream end and showing the upstream hinge clamp, the downstream hinge clamp, and the composite charge in the angled configuration;

FIG. 32 is a side view of the forming system showing the removal of the blanket assembly and forming device from the forming mandrel and illustrating the composite charge conformed to the cross-sectional shape of the forming mandrel.

DETAILED DESCRIPTION

Figure 1:
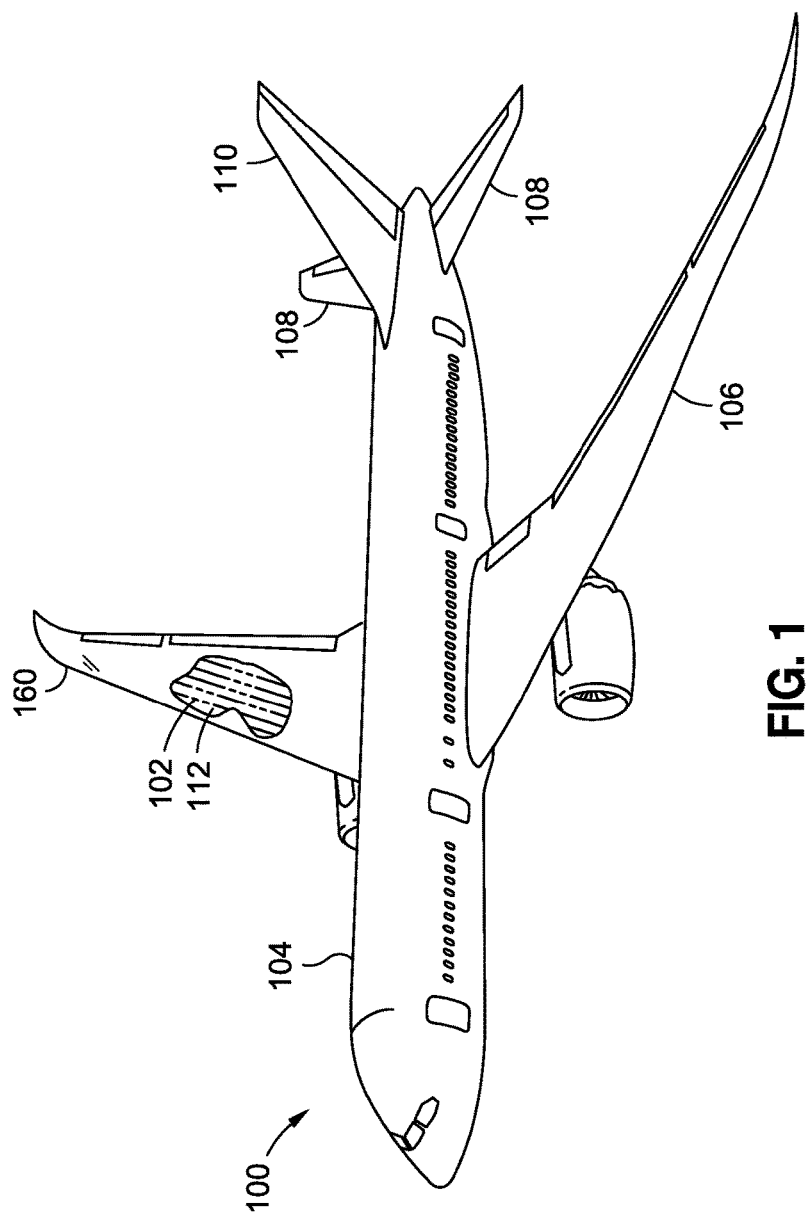
FIG. 1 is a perspective view of an aircraft having composite wings each comprising a composite wing panel stiffened by a plurality of composite stringers.
Figure 26:
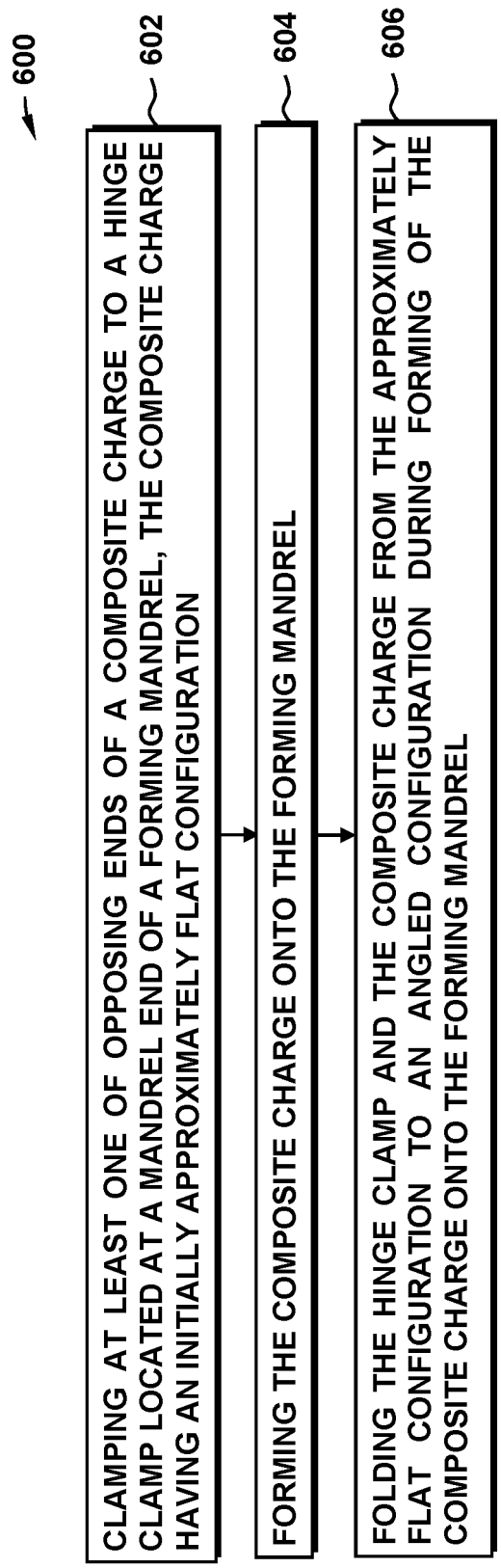
FIG. 26 is a flowchart having one or more operations included in a method of forming a composite charge onto a forming mandrel using an the upstream hinge clamp and a downstream hinge clamp for respectively holding the composite charge in position relative to the mandrel upstream end and mandrel downstream end.

Referring now to the drawings wherein the showings are for purposes of illustrating preferred and various embodiments of the disclosure, shown in FIG. 1 is an aircraft 100 which may incorporate one or more composite structures 102 that may be fabricated using the presently-disclosed charge clamping system 300 (FIG. 3) and forming method (FIG. 26). The aircraft 100 may include a fuselage 104 having an empennage including one or more horizontal tails 108 and a vertical tail 110. In addition, the aircraft 100 may include a pair of wings 106 extending outwardly from the fuselage 104. The fuselage 104, the wings 106, the horizontal tails 108, the vertical tail 110, and other components may include a composite skin (not shown) stiffened by a plurality of elongated composite stringers 112. The composite stringers 112 may each be fabricated by forming an uncured composite charge 500 over a forming mandrel 202 (FIG. 3).

Figure 2:
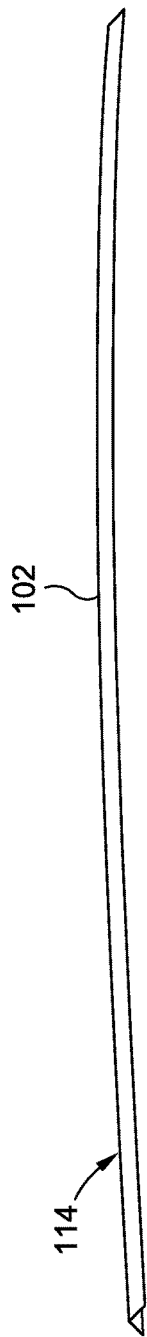
FIG. 2 is a perspective view of an example of an L-shaped stringer, two of which may be assembled in back-to-back relation to form a T-shaped composite stringer, and wherein each L-shaped stringer may be formed on a forming mandrel and held in position at each of opposing ends of the composite charge using a hinge clamp as disclosed herein.

In the presently-disclosed forming system 200 (FIG. 3) and method 600 (FIG. 26), any forming technology may be implemented in which lengthwise tension 460 (FIG. 8) is applied to the composite charge 500 as the composite charge 500 transitions from an approximately flat configuration 332 (FIG. 3) to an angled configuration 334 (FIG. 3) during the process of forming the composite charge 500 over the forming mandrel 202 as a means to reduce or prevent the formation of wrinkles in the composite charge 500. In this regard, the opposing ends of the composite charge 500 are accurately held in position relative to the respective opposing ends of the forming mandrel 202 using the presently-disclosed clamping system 300. The lengthwise tension 460 is continuously applied as the composite charge 500 transitions from the approximately flat configuration 332 to the angled configuration 334 (FIG. 3). In the presently-disclosed system 200 and method 600, the composite charge 500 is maintained in centered relation to the forming mandrel 202 during the forming process, after which the composite charge 500 is removed from the forming mandrel 202. In an embodiment, an uncured composite charge 500 may be formed over a forming mandrel 202 using a technique known as general in-tension discrete extrusion (GLIDE) forming, referred to herein as glide forming. During glide forming of an uncured composite charge 500 over a forming mandrel 202, the presently-disclosed clamping system 300 secures the opposing ends of the composite charge 500 in position relative to the respective opposing ends of the forming mandrel 202 while a blanket assembly 400 is translated along the forming mandrel 202 as the composite charge 500 slides between the blanket assembly 400. FIG. 2 is a perspective view of an example of an L-shaped stringer 114 that may be formed over a forming mandrel 202.

Figure 3:
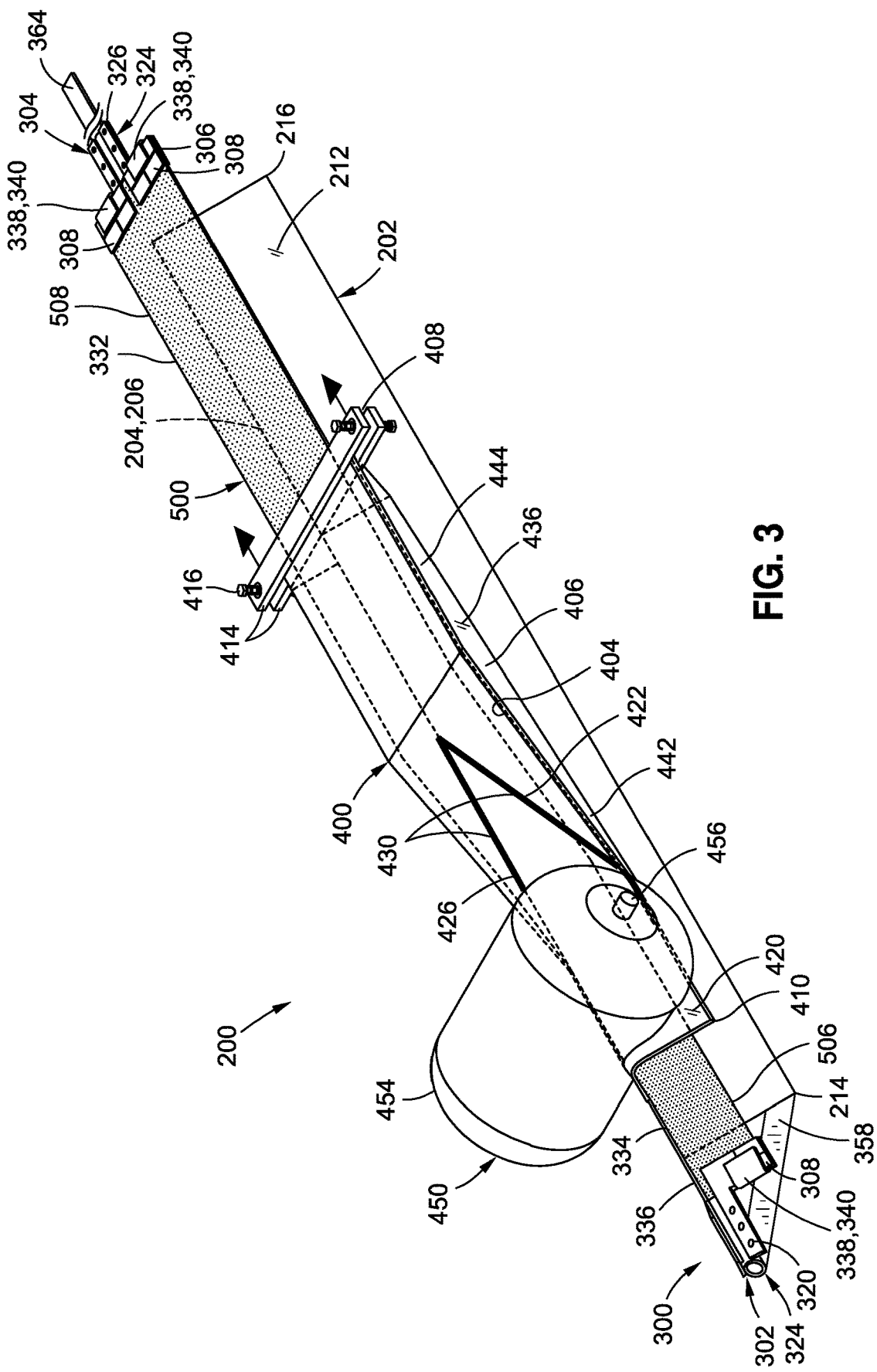
FIG. 3 is a perspective view of an example of a forming system for forming a composite charge onto a forming mandrel by translating a heat blanket assembly along the forming mandrel while the composite charges slides through the blanket assembly and is held in position at the mandrel upstream end and mandrel downstream end respectively using an upstream hinge clamp and a downstream hinge clamp.

FIG. 3 shows an example of a forming system 200 for glide forming a composite charge 500 over a forming mandrel 202 by translating a blanket assembly 400 along a lengthwise direction of the forming mandrel 202 while the composite charge 500 slides between an upper heating blanket 404 and a lower heating blanket 406 of the blanket assembly 400. The forming mandrel 202 has a mandrel upstream end 214 and a mandrel downstream end 216. The composite charge 500 has a charge upstream end 506 and a charge downstream end 508 which are respectively clamped and held in position relative to the mandrel upstream end 214 and the mandrel downstream end 216 respectively using an upstream hinge clamp 302 and a downstream hinge clamp 304 of the presently-disclosed clamping system 300.

Regardless of the forming technique, the upstream hinge clamp 302 and the downstream hinge clamp 304 advantageously allow for the continuous application of lengthwise tension 460 (FIG. 8) to the composite charge 500 as the composite charge 500 transitions from an approximately flat configuration 332 to an angled configuration 334, such as during glide forming when the blanket assembly 400 is translated lengthwise along the forming mandrel 202. In addition, the upstream hinge clamp 302 and the downstream hinge clamp 304 allow for accurate positioning and secure clamping of the respective ends 506, 508 of the composite charge 500 during forming over the forming mandrel 202, and also allow for the rapid release of the ends 506, 508 of the composite charge 500 after forming the composite charge 500 over the forming mandrel 202. Furthermore, the downstream hinge clamp 304 is configured to allow for lateral steering 462 (FIG. 8) of the composite charge 500 for maintaining the charge centerline 502 (FIG. 4) aligned or centered on the forming mandrel 202 during the application of lengthwise tension 460 (FIG. 8) as the blanket assembly 400 is translated along the forming mandrel 202.

Figure 9:
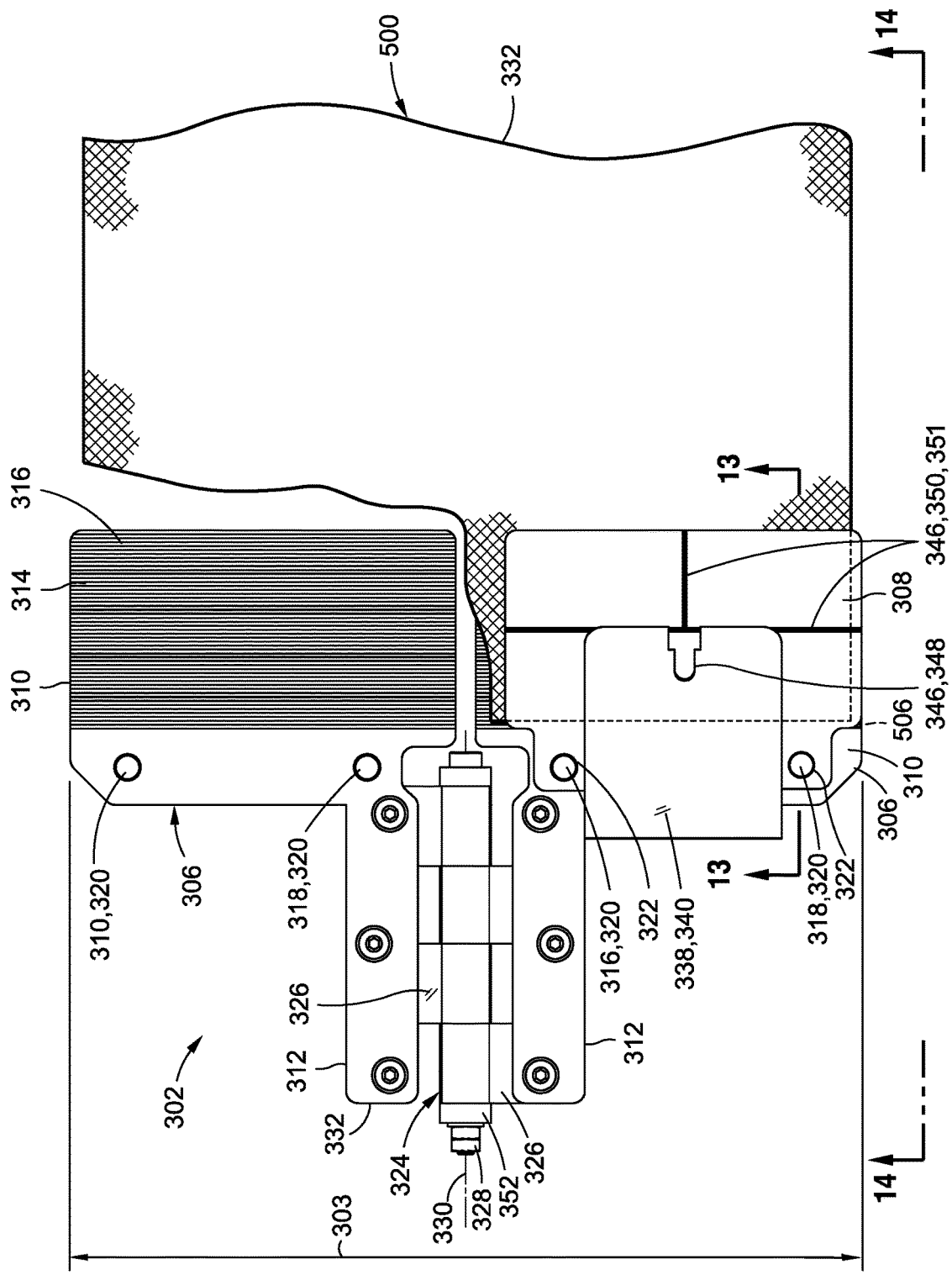
FIG. 9 is a top partially cutaway view of an example of an upstream hinge clamp for holding the composite charge relative to the mandrel upstream end.
Figure 16:
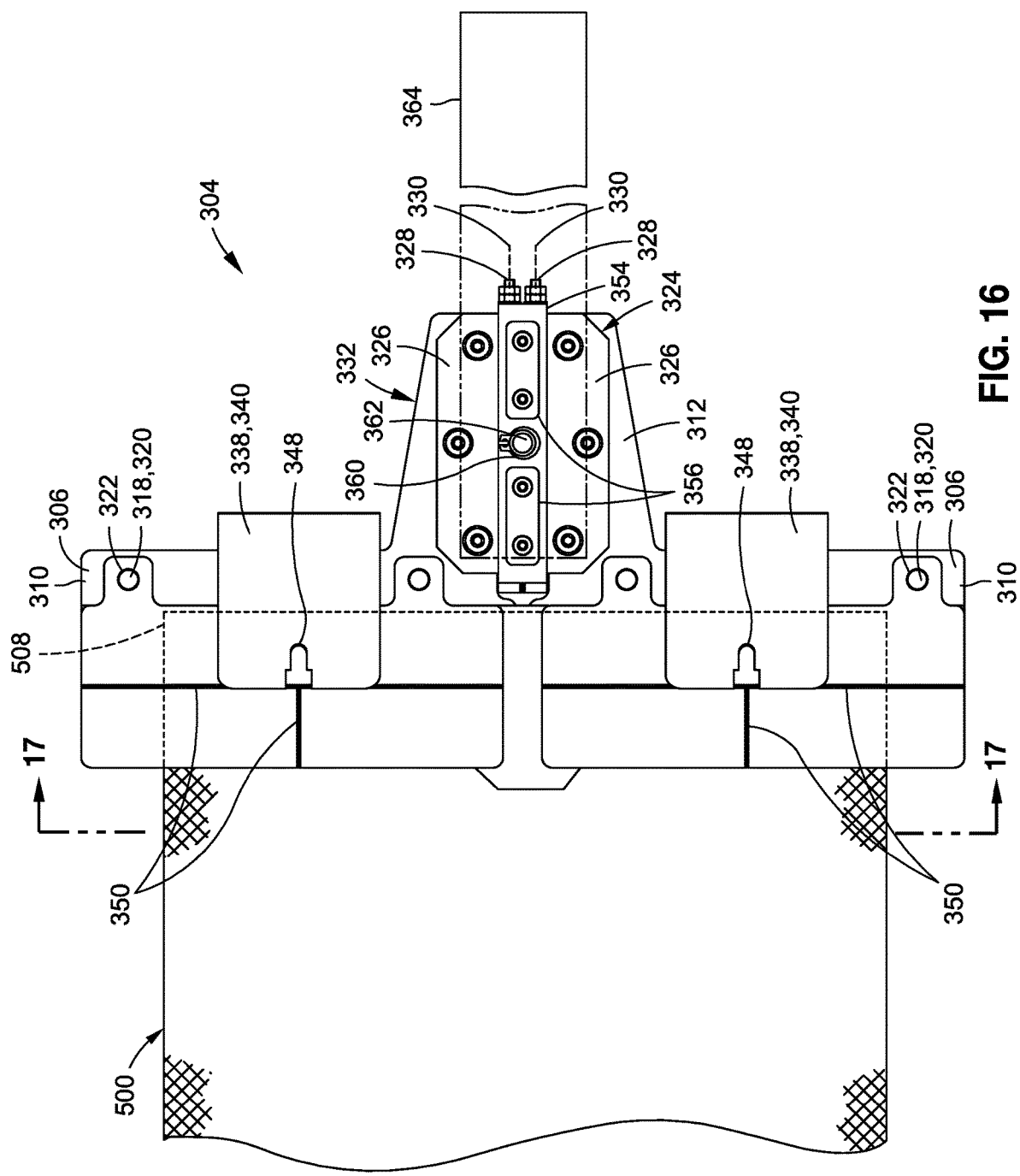
FIG. 16 is a top view of an example of a downstream hinge clamp for holding the composite charge relative to the mandrel downstream end.

Referring to FIG. 3, the upstream hinge clamp 302 and the downstream hinge clamp 304 each include a hinge 324 configured for folding of the hinge clamp 302, 304 and the corresponding end 506, 508 of the composite charge 500 about at least one hinge axis 330 (FIGS. 9 and 16). The upstream hinge clamp 302 and the downstream hinge clamp 304 are each configured to fold or pivot between an approximately flat configuration 332 and an angled configuration 334. The angled configuration 334 of a hinge clamp 302, 304 may correspond to the cross-sectional shape of the forming mandrel 202 which has a mandrel top portion 204 interconnecting a pair of mandrel side surfaces 212. Each hinge axis 330 is preferably oriented approximately parallel to (e.g., within 30 degrees) and/or coincident with a folding axis 336 of the composite charge 500. A folding axis 336 (FIG. 21) is defined at or located proximate to an intersection of the mandrel top portion 204 (FIG. 21) or level tangent 208 (FIG. 21) with at least one of opposing mandrel side surfaces 212 of the forming mandrel 202. In the example of a forming mandrel 202 having an inverted V-shaped cross-section as shown in FIGS. 21-25, the mandrel top portion 204 may be described as a radiused apex 206 interconnecting the mandrel side surfaces 212 of the inverted V-shaped cross-section. However, in other forming mandrel embodiments not shown, the mandrel top portion interconnecting the mandrel side surfaces 212 may not necessarily have the cross-sectional profile of a radius as may be preferable, but may instead have a cross-sectional profile of a non-radiused corner (not shown) such as a compound curvature profile or a sharp corner.

Although the mandrel side surfaces 212 of the inverted V-shaped cross-section are shown forming an acute angle in FIGS. 15, 17, and 20-25, the mandrel side surfaces 212 may be oriented in any one of a variety of angles depending on the angle between the legs of the stringer to be formed by the forming mandrel 202. For example, the mandrel side surfaces 212 may form an acute angle, an obtuse angle, or a right angle. Furthermore, although the presently-disclosed hinge clamps 302, 304 are described in the context of forming a composite charge 500 onto a forming mandrel 202 having an inverted V-shaped cross-section having a radiused apex 206 interconnected an opposing pair of inclined mandrel side surfaces 212 as shown in the figures, it is contemplated that the hinge clamps 302, 304 may be configured for forming a composite charge 500 over a forming mandrel 202 having any one of a variety of other cross-sectional shapes, including cross-sectional shapes having more than one folding axis 336. For example, although not shown, the hinge clamps 302, 304 may be configured for forming a composite charge 500 over a forming mandrel having a trapezoidally-shaped or rectangularly-shaped (e.g., omega-shaped) cross-section (not shown) for producing a hat section stringer (not shown) having a horizontal cap interconnecting a pair of vertical or inclined webs, each terminating at a horizontal base flange. Such a trapezoidally or rectangularly-shaped forming mandrel (not shown) may have a spaced pair of folding axes respectively located at the intersection of each mandrel side surface with the horizontal mandrel top portion which may be generally flat. The intersection of each mandrel side surface with the horizontal mandrel top portion may be radiused. In such an embodiment, each end of the composite charge may be held in position by a pair of side-by-side hinge clamps (not shown) each having a hinge axis oriented generally parallel to the axis of one of the radii connecting a mandrel side surface to the mandrel top portion.

In FIG. 3, the composite charge 500 is positioned between the upper heating blanket 404 and the lower heating blanket 406, each of which has a blanket forward end 408 (e.g., a heat blanket entrance) and a blanket aft end 410 (e.g., a heat blanket exit). The upper heating blanket 404 and the lower heating blanket 406 each have a blanket width that is preferably no wider than the width of the composite charge 500. The upper heating blanket 404 and/or the lower heating blanket 406 may each include at least one heating element 432 (FIG. 4) for heating the composite charge 500. Heat 434 (FIG. 27) from the upper heating blanket 404 and/or lower heating blanket 406 may reduce the viscosity of resin in the composite charge 500 to facilitate forming of the composite charge 500 over the cross-sectional shape of the forming mandrel 202.

Figure 4:
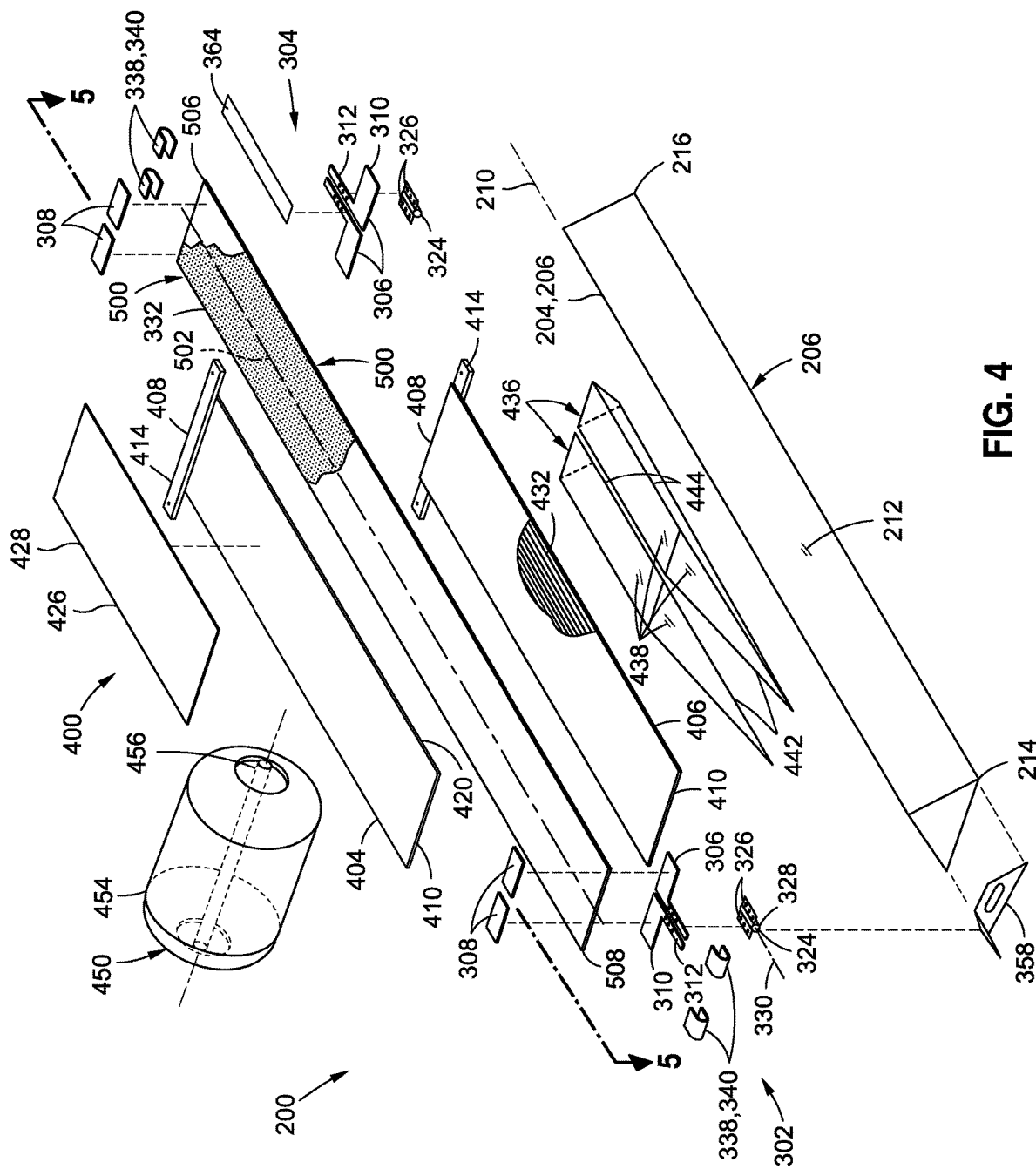
FIG. 4 is an exploded perspective view of the forming system of FIG. 3 prior to the composite charge being formed onto the forming mandrel.

Referring to FIGS. 3-4, the blanket assembly 400 includes a pair of wedge elements 436 positionable between the underside of the lower heating blanket 406 and the respective mandrel side surfaces 212 of the forming mandrel 202. The pair of wedge elements 436 may optionally be resiliently compressible, and may be permanently or removably attached to the lower heating blanket 406. Each one of the wedge elements 436 includes a tapered section 442 (FIGS. 4 and 6-7) along which the composite charge 500 transitions from an initially approximately flat configuration 332 at a location forward of the tapered section 442, to an angled configuration 334 at a location aft of the tapered section 442 where the composite charge 500 has been conformed to the cross-sectional shape of the forming mandrel 202. The weight of the upper heating blanket 404 exerts a blanket forming pressure 424 (FIGS. 27-30) over the composite charge 500 to progressively form the composite charge 500 against the mandrel side surfaces 212 and wedge element top sides 438 (e.g., FIGS. 4, 6, 7, 20, and 23) as the blanket assembly 400 is translated along the forming mandrel 202. In this regard, the blanket forming pressure 424 induces in each of laterally opposite sides of the composite charge 500 a Z-shaped contour 510 (FIGS. 22-23) having a laterally-outwardly-moving slipping zone 512 (FIG. 23) located along a juncture of each mandrel side surface 212 with a wedge element top side 438, and within which composite plies 504 (FIG. 23) interlaminarly slip relative to one another, facilitated by reduced resin viscosity in the composite charge 500 due to heat 434 from the upper heating blanket 404 and/or lower heating blanket 406. The reduction in resin viscosity reduces interlaminar friction between the composite plies 504 which facilitates interlaminar slipping of the composite plies 504 relative to one another.

An optional mass element 426 (FIG. 4) may be applied over or included with the upper heating blanket 404 to increase the blanket forming pressure 424 on the composite charge 500 at least along the length of the tapered sections 442. The mass element 426 may be a mass layer 428 (FIG. 4) of flexible material uniformly distributed over the upper heating blanket 404. Alternatively or additionally, the mass element 426 may be a pair of discrete mass strips 430 (FIG. 3) mounted to the upper heating blanket 404 and respectively positioned along the pair of diagonal notches 422. The diagonal notches 422 are respectively formed on opposing lateral sides of the forming mandrel 202 at the juncture of the wedge element top side 438 and a mandrel side surface 212 of the forming mandrel 202.

In FIGS. 3-4 and 6-8, the forming system 200 includes a forming device 450 supported on a blanket aft extension 420 of the blanket assembly 400. In this regard, the forming device 450 is positioned upstream of the wedge elements 436 at the location where the composite charge 500 has been generally formed over the radius of the forming mandrel 202. The forming device 450 may be resiliently compressible for applying forming device pressure 452 (FIGS. 19 and 28-31) uniformly to the composite charge 500 for forming the composite charge 500 to the cross-sectional shape of the forming mandrel 202. The resiliently compressible nature of the forming device 450 accommodates variations in cross-sectional shape along the lengthwise direction of the forming mandrel 202. In an embodiment, the forming device 450 may be an inflatable bladder. For example, the forming device 450 may be a rollable element 454 having an axle 456. A translating mechanism 366 such as a robotic device 368 (FIG. 8) may be engaged to the axle 456 for controlling the movement of the rollable element 454. In this regard, the translating mechanism 366 may initially apply the rollable element 454 over the tapered section 442 forward end of the wedge elements 436 (e.g., see FIG. 28), and roll the rollable element 454 along the tapered sections 442 in an upstream direction toward the aft blanket extension (e.g., see FIG. 29), after which the rollable element 454 is held stationary (i.e., non-rolling) on the aft blanket extension. As mentioned above, the translating mechanism 366 may be configured to cause the forming device 450 to apply forming device pressure 452 (FIG. 28-31) on the blanket aft extension 420 to conform the composite charge 500 to the cross-sectional shape of the forming mandrel 202 as the blanket assembly 400 and forming device 450 are translated as a unit by the same or separate translating mechanisms 366 along the forming mandrel 202 as illustrated in FIGS. 29-31 and described below.

In FIGS. 3-4, as indicated above, the composite charge 500 may initially have an approximately planar or flat configuration 332 prior to being formed into an angled configuration 334 corresponding to the cross-sectional shape of the forming mandrel 202. The composite charge 500 may be laid up as a plurality of composite plies 504 (FIG. 21) in a stacked formation. The composite plies 504 may be comprised of fiber-reinforced polymer matrix material. For example, the composite plies 504 may be fiber-reinforced polymer matrix material such as carbon fiber-reinforced epoxy material, and may be provided as prepreg thermosetting material or prepreg thermoplastic material. However, the fiber-reinforced polymer matrix material may be comprised of fibers formed of any material including metal, glass, ceramic, or other fiber compositions. The matrix material may be any type of thermosetting matrix material or thermoplastic matrix material.

Figure 5:
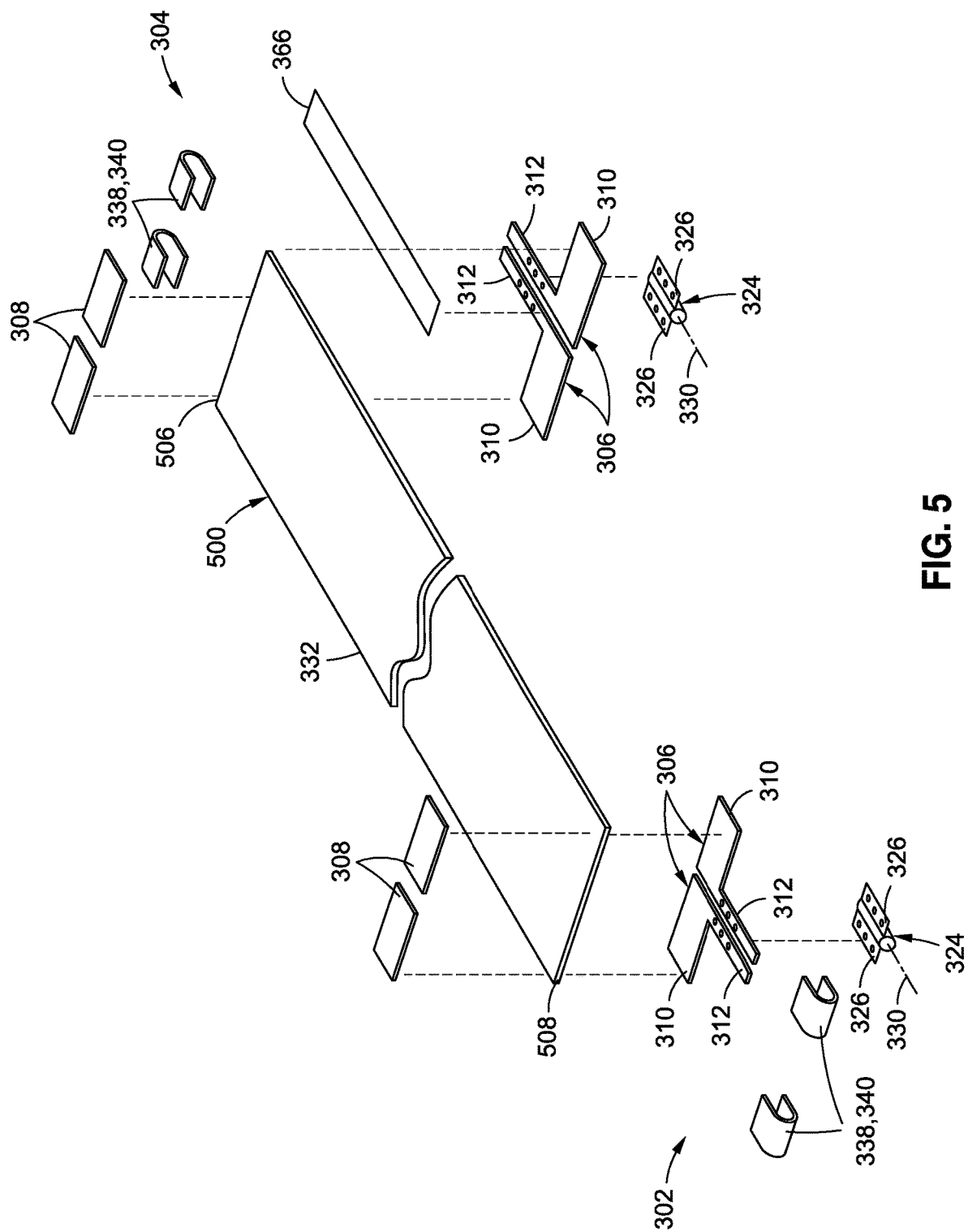
FIG. 5 is a perspective view of the composite charge and the upstream hinge clamp and downstream hinge clamp for holding the composite charge in position relative to the respective mandrel upstream end and mandrel downstream end.

Referring to FIGS. 4-5, the upstream hinge clamp 302 is fixedly coupled to the mandrel upstream end 214 by a hinge mounting bracket 358 at a location immediately upstream of the mandrel upstream end 214. The hinge mounting bracket 358 may be attached to a frame or fixture (not shown) that supports the forming mandrel 202. As mentioned above, the upstream hinge clamp 302 is configured to clamp onto the charge upstream end 506 of the composite charge 500. The upstream hinge clamp 302 is stationary relative to the forming mandrel 202, and only pivots about the hinge axis 330. The downstream hinge clamp 304 is positioned at the mandrel downstream end 216 and is configured to clamp onto the charge downstream end 508 of the composite charge 500. The downstream hinge clamp 304 is non-attached to the mandrel downstream end 216, and is configured to hold the charge downstream end 508 in position relative to the mandrel downstream end 216. In the example shown, the downstream hinge clamp 304 is coupled to a forward extension element 364 which, in turn, is coupled to a charge tensioning mechanism 458 (FIG. 8) configured to apply lengthwise tension 460 (FIG. 8) to the composite charge 500. The charge tensioning mechanism 458 may be a robotic device 368 (FIG. 8), an overhead gantry (not shown), or any one of a variety of other devices for applying lengthwise tension 460 (FIG. 8) to the composite charge 500 from the charge downstream end 508.

Referring still to FIGS. 4-5, the upstream hinge clamp 302 and the downstream hinge clamp 304 each include a hinge 324 having a pair of hinge halves 326 pivotably coupled together by at least one hinge pin 328. For example, the upstream hinge clamp 302 includes a single hinge pin 328 about which the hinge halves 326 are pivotable as shown in FIG. 9 and described in greater detail below. The downstream hinge clamp 304 includes a pair of hinge pins 328 about which the hinge halves 326 are respectively pivotable as shown in FIG. 16 and described in greater detail below. The upstream hinge clamp 302 and the downstream hinge clamp 304 each include a pair of lower plates 306 arranged in side-by-side relation to each other and located on opposite sides of the hinge axis 330 and respectively coupled to the pair of hinge halves 326. In addition, the upstream hinge clamp 302 and the downstream hinge clamp 304 each include a pair of upper plates 308 configured to be respectively mounted over the pair of lower plates 306. The upstream hinge clamp 302 and the downstream hinge clamp 304 each include a pair of removable clamping devices 338 configured to be respectively mounted over the pair of upper plates 308 and lower plates 306 for clamping the composite charge 500 between the upper plate 308 and lower plate 306 on each of the opposing lateral sides of the hinge clamp 302, 304. As mentioned above, the upstream hinge clamp 302 and the downstream hinge clamp 304 are each configured to rotate or pivot about at least one hinge axis 330 to allow the composite charge 500 to transition from the approximately flat configuration 332 (FIG. 3-9) to the angled configuration 334 (FIG. 3) during the progressive forming of the composite charge 500 onto the forming mandrel 202.

Figure 6:
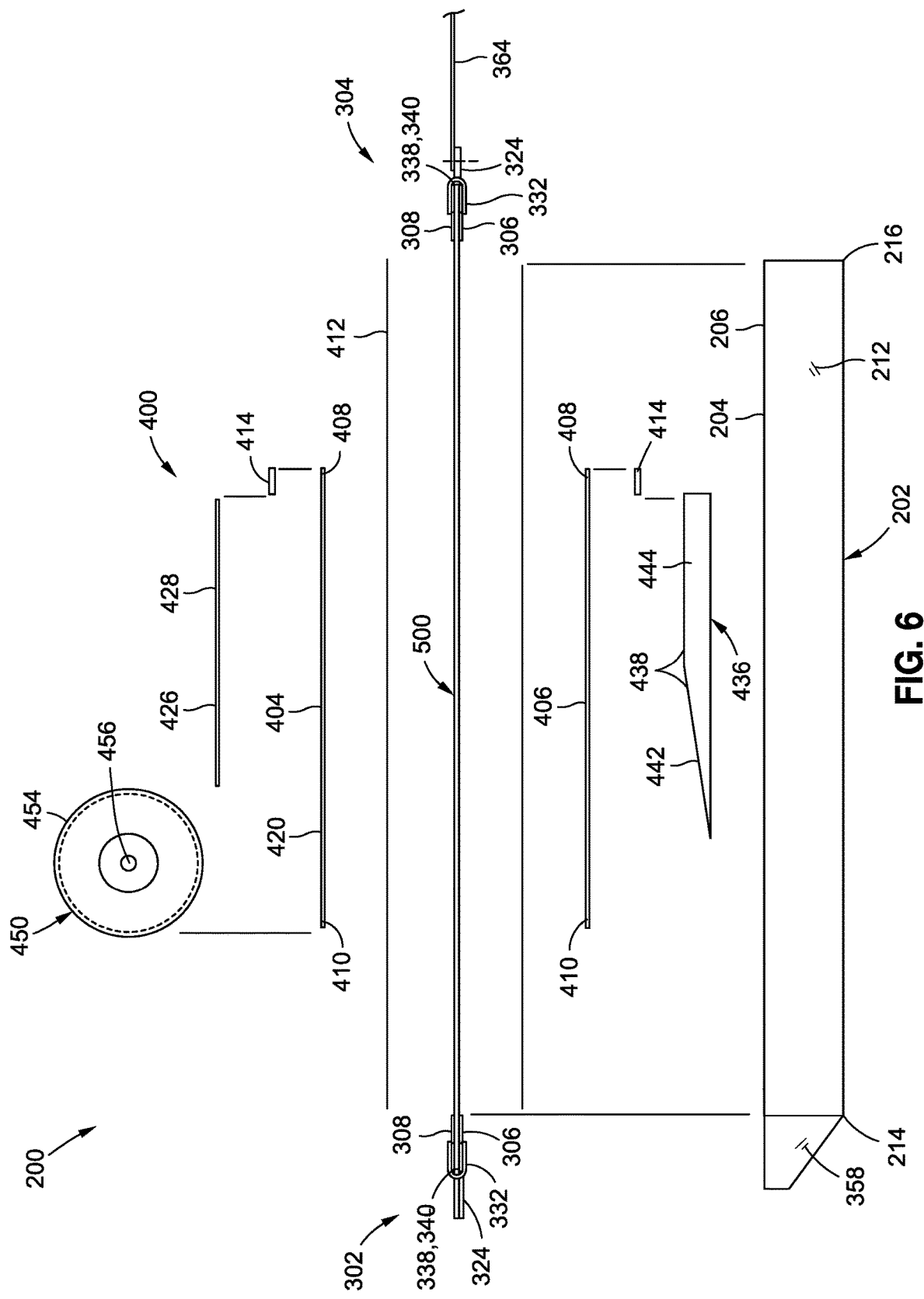
FIG. 6 is an exploded side view of the forming system prior to the composite charge being formed onto the forming mandrel.

FIG. 6 is an exploded side view of the forming system 200 showing the composite charge 500 located between the upper heating blanket 404 and the lower heating blanket 406. The upper heating blanket 404 and the lower heating blanket 406 each have a blanket length extending between the blanket forward end 408 and the blanket aft end 410. The upper heating blanket 404 and the lower heating blanket 406 are preferably aligned with each other at the blanket forward end 408 and the blanket aft end 410 within approximately (e.g., within 25 mm). A removable protective layer 412 (e.g., polyester, nylon, fluorinated ethylene propylene) may be included between the upper heating blanket 404 and composite charge 500, and between the lower heating blanket 406 and the composite charge 500 to prevent contamination of the composite charge 500 during the forming process. The opposing ends 506, 508 of the composite charge 500 extend past the respective mandrel upstream end 214 and mandrel downstream end 216. The charge upstream end 506 is secured to the upstream hinge clamp 302 which is fixedly coupled to the hinge mounting bracket 358 located at the mandrel upstream end 214. The charge downstream end 508 is coupled to the forward extension element 364 which is coupled to the charge tensioning mechanism 458 (FIG. 8) at the mandrel downstream end 216.

Figure 7:
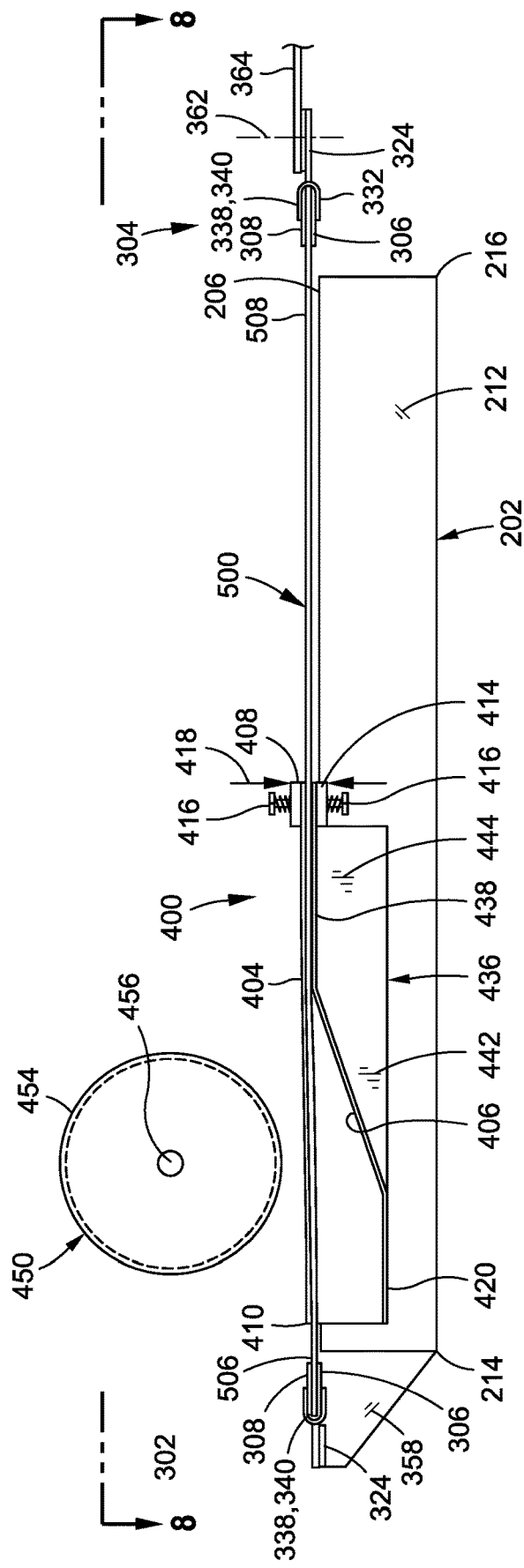
FIG. 7 is an assembled side view of the forming system of FIG. 6.

Referring to FIGS. 6-7, the above-mentioned pair of wedge elements 436 each have a wedge element top side 438 (FIG. 20) that extends along the tapered section 442 and forward section 444. The wedge element top sides 438 support the blanket assembly 400 and the portion of the composite charge 500 passing over the wedge elements 436 during translation of the blanket assembly 400 along the forming mandrel 202. The wedge element inner sides 440 (FIG. 20) bear against the opposing mandrel side surfaces 212. The forward section 444 of the wedge elements 436 support the composite charge 500 in the approximately flat configuration 332 (e.g., FIGS. 20-21), and provides a location where the upper heating blanket 404 and the lower heating blanket 406 may heat the composite charge 500 to reduce the resin viscosity prior to the composite charge 500 passing over the tapered sections 442 as the blanket assembly 400 is translated along the forming mandrel 202. The tapered section 442 of each wedge element 436 tapers or reduces in height from the tapered section 442 forward end to the tapered section 442 aft end. As the composite charge 500 passes over the tapered sections 442, the blanket forming pressure 424 on the composite charge 500 causes the composite charge 500 to progressively transition from the approximately flat configuration 332 to the angled configuration 334 conforming to the cross-sectional shape of the forming mandrel 202, as shown in FIGS. 20-25 and described in greater detail below.

Referring to FIGS. 3-4 and 6-8, the upper heating blanket 404 and the lower heating blanket 406 each include a rigid element 414 such as a bar, plate, or rod at the forward blanket end. Each rigid element 414 may be engaged by a translating mechanism 366 (FIG. 8) for translating the blanket assembly 400 along the forming mandrel 202. For example, the translating mechanism 366 may be a robotic device 368 (FIG. 8) movable along a track system 372 and having an end effector 370 configured to grip or engage the rigid elements 414. The end effector 370 of the robotic device 368 may be configured to urge the rigid elements 414 of the upper heating blanket 404 and the lower heating blanket 406 toward each other to generate a blanket entrance clamping pressure 418 on the composite charge 500 at the blanket forward end 408. As a result of the blanket forming pressure 424, the pulling of the blanket assembly 400 by the translating mechanism 366 results in lengthwise tension 460 (FIG. 8) at least in the portion of the composite charge 500 located between the blanket forward end 408 and the forming device 450. The lengthwise tension 460 (FIG. 8) reduces or prevents the formation of generally lengthwise wrinkles (not shown) and/or creases (not shown) in the composite charge 500 by absorbing or accommodating excess composite charge material (not shown) that would otherwise build up as a result of the above-mentioned Z-shaped contour 510 (FIGS. 22-23) induced in laterally opposite sides of the composite charge 500 passing over the tapered sections 442.

Figure 8:
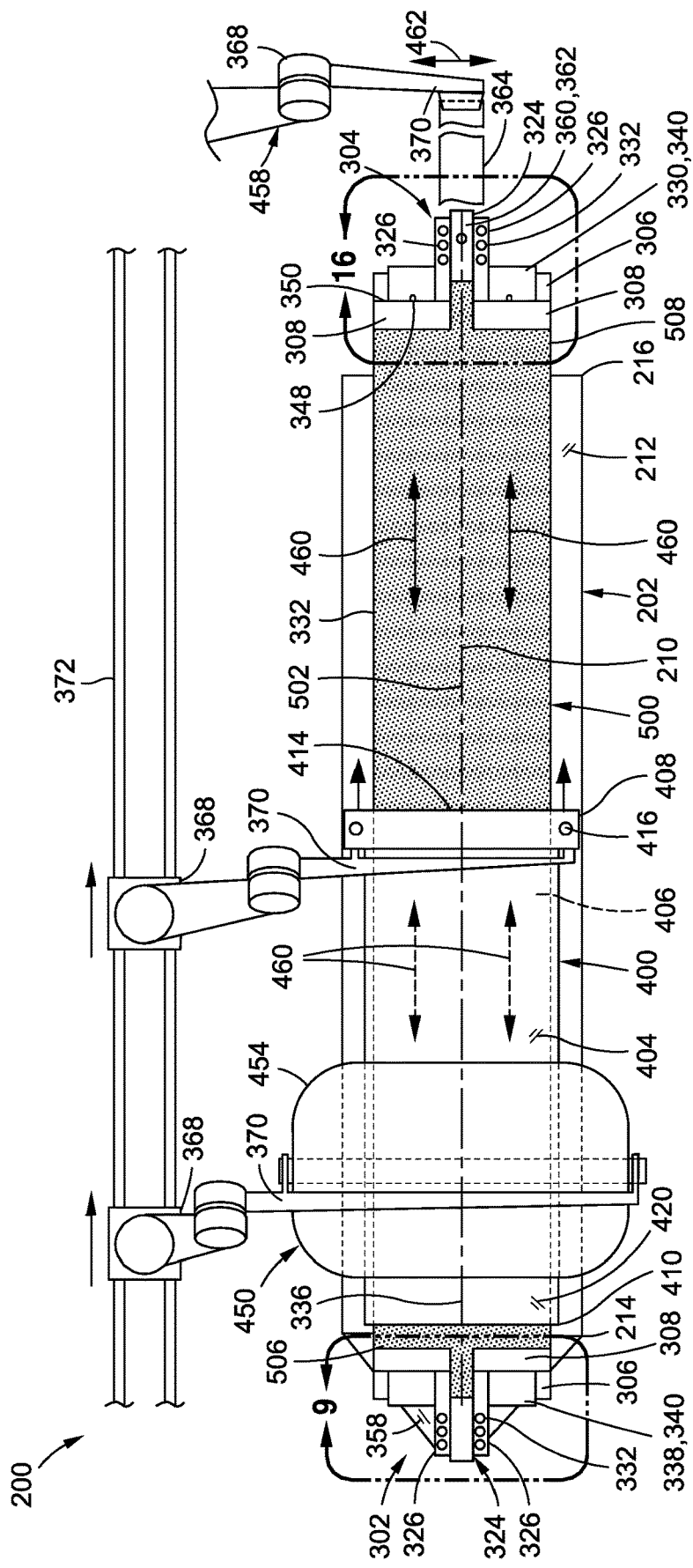
FIG. 8 is a top view of the forming system of FIG. 7.

Referring to FIG. 8, lengthwise tension 460 may also be applied to the composite charge 500 at the charge downstream end 508 by the charge tensioning mechanism 458 (FIG. 8) which is coupled to the downstream hinge clamp 304 via the forward extension element 364. The charge tensioning mechanism 458 may apply constant lengthwise tension 460 to the composite charge 500 during the forming process as a means to absorb slack that may otherwise develop in the composite charge 500 during translation of the blanket assembly 400 along the forming mandrel 202. In addition, the charge tensioning mechanism 458 may function as a lateral steering 462 mechanism for keeping the charge centerline 502 aligned with and/or centered on the forming mandrel 202 (e.g., at the instant location of the blanket forward end 408) by laterally steering 462 the charge downstream end 508 in a lateral direction as the blanket assembly 400 is translated along the forming mandrel 202, as described in greater detail below.

Referring to FIG. 9, shown is a top-down, partially cutaway view of the upstream hinge clamp 302 for holding the composite charge 500 relative to the mandrel upstream end 214. As mentioned above, the upstream hinge clamp 302 includes a pair of hinge halves 326 pivotably coupled together by a hinge pin 328. In addition, the upstream hinge clamp 302 includes a pair of lower plates 306 arranged in side-by-side relation to each other and respectively coupled to the pair of hinge halves 326. In the example shown, each one of the lower plates 306 has a main portion 310 and a tang portion 312. The main portion 310 includes an inner clamping surface 314 configured to interface with the composite charge 500. The tang portion 312 extends longitudinally from the main portion 310 and is mechanically fastened to one of the hinge halves 326. However, in an embodiment not shown, each lower plate 306 and hinge half 326 may be integrally formed as a unitary structure. In FIG. 9, a pair of upper plates 308 are respectively mountable over the pair of lower plates 306. The charge upstream end 506 is positioned between the upper plates 308 and lower plates 306. The upstream hinge clamp 302 additionally includes a pair of clamping devices 338 respectively mountable over the pair of upper plates 308 and lower plates 306 for respectively clamping the charge upstream end 506 between the upper plates 308 and lower plates 306, as described in greater detail below.

In FIGS. 9-12, the upper plates 308 and/or the lower plates 306 may include one or more plate alignment elements 318 for positioning the upper plate 308 and lower plate 306 in alignment relative to each other. In the example shown, the plate alignment elements 318 may be provided as a pair of alignment pins 320 fixedly mounted to each lower plate 306. For example, a pair of alignment pins 320 may be press-fit into bores (not shown) formed in the lower plate 306. Alternatively, the alignment pins 320 may be integrally formed with (e.g., machined, cast, etc.) the lower plate 306. The alignment pins 320 may be configured to be slidably received within clearance-fit holes 322 (e.g., 0.15 mm larger than alignment pin diameter) formed in the corresponding upper plate 308. Alternatively, a pair of alignment pins 320 may be fixedly mounted to each upper plate 308 for receipt within clearance-fit holes 322 formed in the corresponding lower plate 306. Advantageously, the alignment pins 320 provide a means for quickly and easily aligning the upper plates 308 with the lower plates 306 during clamping of the composite charge 500. In FIGS. 9-19, the upstream hinge clamp 302 preferably has a total width 303 that is at least as wide as the composite charge 500. The width 303 of the upstream hinge clamp 302 may be measured from an outer edge of one upper plate 308 or lower plate 306 on one lateral side of the hinge clamp to the outer edge of the opposing upper plate 308 or lower plate 306 on the opposite lateral side of the hinge clamp. The hinge 324, the hinge pin 328, the upper plates 308, and the lower plates 306 may be formed of a metallic material such as aluminum, titanium, steel, or other metallic material. Additionally or alternatively, the hinge 324, the hinge pin 328, the upper plates 308, and the lower plates 306 may be formed of non-metallic material such as composite material including fiber-reinforced polymeric material such as carbon-fiber reinforced plastic (e.g., graphite-epoxy).

The upper plate 308 and the lower plate 306 may be generally planar, and may each have mechanical gripping elements 316 formed on the inner clamping surface 314 for gripping the composite charge 500 when clamped between the upper plates 308 and lower plates 306. In the example shown, the mechanical gripping elements 316 may include serrations or grooves oriented along a direction transverse to the lengthwise direction of the composite charge 500. However, the mechanical gripping elements 316 may include mechanical features of any size, shape, orientation, and configuration. For example, mechanical gripping elements 316 may include, without limitation, serrations, grooves, ridges, depressions, protuberances, spikes, and/or any one of a variety of other features capable of mechanically engaging the composite charge 500 and preventing slipping of the composite charge 500 between the upper plates 308 and lower place during the process of forming the composite charge 500 to the cross-sectional shape of the forming mandrel 202.

Referring to FIGS. 9-12, shown is an example of the clamping device 338 configured as a one-piece spring clamp 340 (FIG. 10) mountable over the upper plate 308 and lower plate 306 on each lateral side of the upstream hinge clamp 302 shown in FIG. 9. The spring clamp 340 has an elongated C-shaped cross-section with opposing free ends 342 as shown in FIG. 11. To install the spring clamp 340 over the upper plate 308 and lower plate 306, the free ends 342 of the spring clamp 340 may be spread apart as shown in FIG. 12 to provide an opening in the spring clamp 340 large enough for the spring clamp 340 to pass over the upper plate 308 and lower plate 306 when the composite charge 500 is clamped therebetween. As shown in FIG. 13, the free ends 342 of the spring clamp 340 may be released onto the upper plate 308 and lower plate 306 causing the spring clamp 340 to exert a plate clamping force 344 which is uniformly distributed by the upper plate 308 and the lower plate 306 onto the composite charge 500.

Referring to FIGS. 10-13, the spring clamp 340 may be formed of a resiliently-flexible material which may be a metallic material such as spring steel and/or a non-metallic material such as fiber-reinforced polymer matrix material (e.g., graphite-epoxy). The spring clamp 340 may be fabricated in a manner to provide the desired plate clamping force 344 on the composite charge 500, taking into consideration the geometry of the spring clamp 340 including the spacing between the free ends 342, the thickness of the spring clamp material, and other parameters which may be optimized to provide the desired plate clamping force 344 on the composite charge 500 when clamped between the upper plate 308 and the lower plate 306 on each side of the hinge clamp 302, 304. The plate clamping force 344 is preferably such that the end of the composite charge 500 is non-movable when clamped between the upper plates 308 and lower plates 306 when the composite charge 500$s$ under lengthwise tension 460 (FIG. 8). The spring clamp 340 preferably has a relatively low profile or height to minimize the total thickness over which the upper heating blanket 404 and lower heating blanket 406 must be spread apart and passed over when the blanket assembly 400 is pulled over the downstream hinge clamp 304 and forward extension element 364 located at the mandrel downstream end 216, as shown in FIG. 31.

Referring briefly to FIGS. 9 and 11, the spring clamp 340 and the upper plate 308 and/or the lower plate 306 may include a spring clamp alignment feature 346. The spring clamp alignment feature 346 may facilitate centering the spring clamp 340 relative to the upper plate 308 and lower plate 306 such that the upper plate 308 and lower plate 306 may uniformly distribute the plate clamping force 344 onto the composite charge 500. In this regard, by centering the spring clamp 340 relative to the upper plate 308 and lower plate 306, the lengthwise tension 460 (FIG. 8) may be uniformly distributed across the width of the composite charge 500. In an embodiment of the spring clamp alignment feature 346, the spring clamps 340 may each include a notch 348 (FIG. 11) formed in each of the free ends 342 of the spring clamp 340. The upper plate 308 and/or the lower plate 306 may include spring clamp alignment features 346 in the form of centering marks 350 (FIG. 9), and which may include a longitudinally-oriented mark and/or a transversely-oriented mark. The centering marks 350 may be embossed, scribed, painted, engraved, machined, cast, or formed in any manner on the exterior surfaces of the upper plate 308 and/or the lower plate 306. In an embodiment, the centering marks 350 may include transversely-extending grooves 351 (FIGS. 10, 12-13) that may be formed (e.g., machined) into the exterior surface of the upper plate 308 and the lower plate 306. Such grooves 351 may guide the installation of the spring clamps 340 into position by engaging with the inner edges of the free ends 342 (FIGS. 10-13) of each spring clamp 340. Further in this regard, the intersection of the centering marks 350 (e.g., grooves) may generally designate the geometric center of an upper plate 308 or lower plate 306. By positioning the spring clamp 340 such that the intersection of the longitudinally-oriented mark and transversely-oriented mark is visible through the notch 348 when the spring clamp 340 is viewed from the top-down direction as shown in FIG. 9, the spring clamp 340 may be generally centered on the upper plate 308 and lower plate 306.

Figure 14:
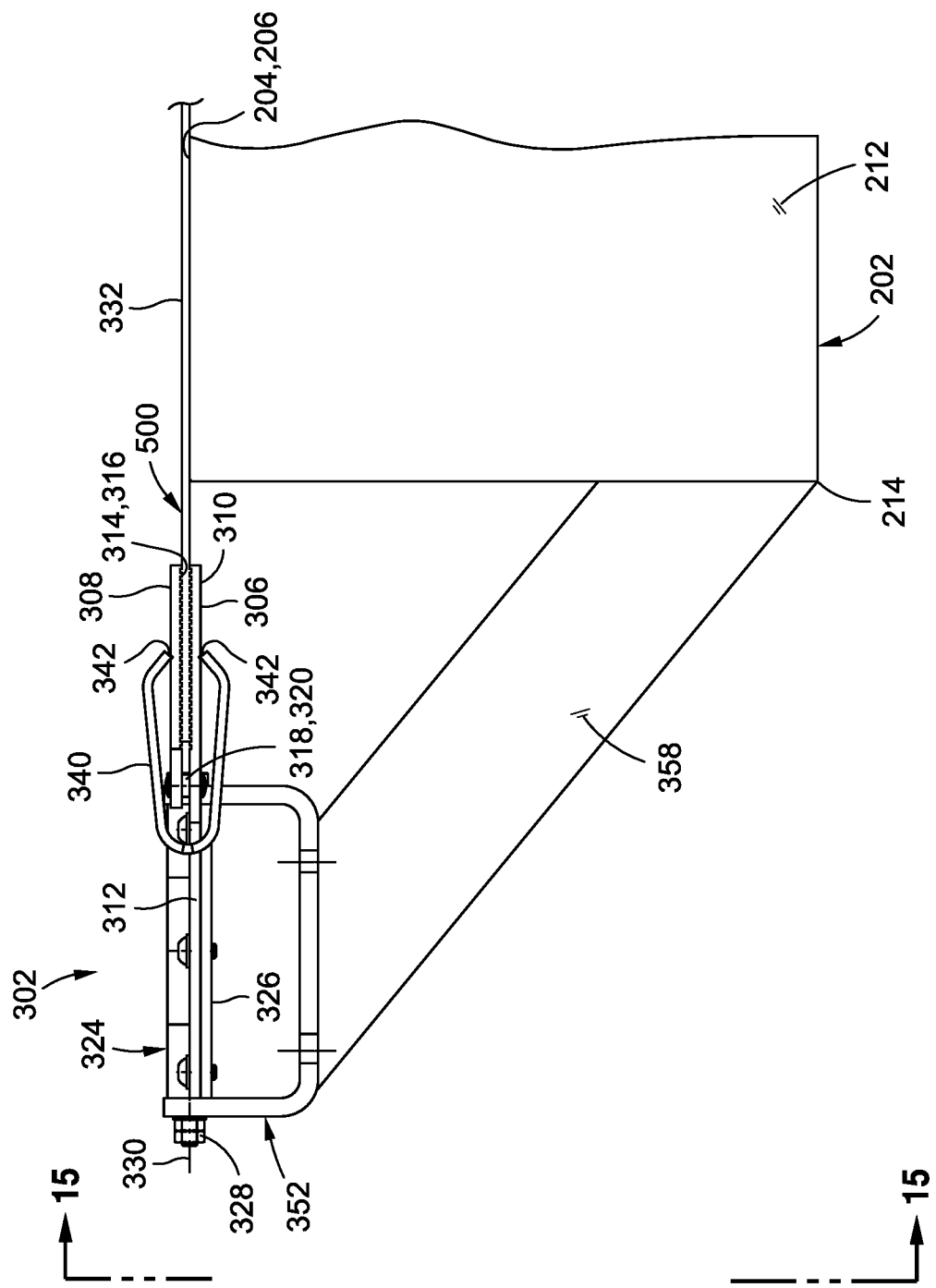
FIG. 14 is a side view of the upstream hinge clamp coupled to the mandrel upstream end by a hinge mounting bracket.
Figure 15:
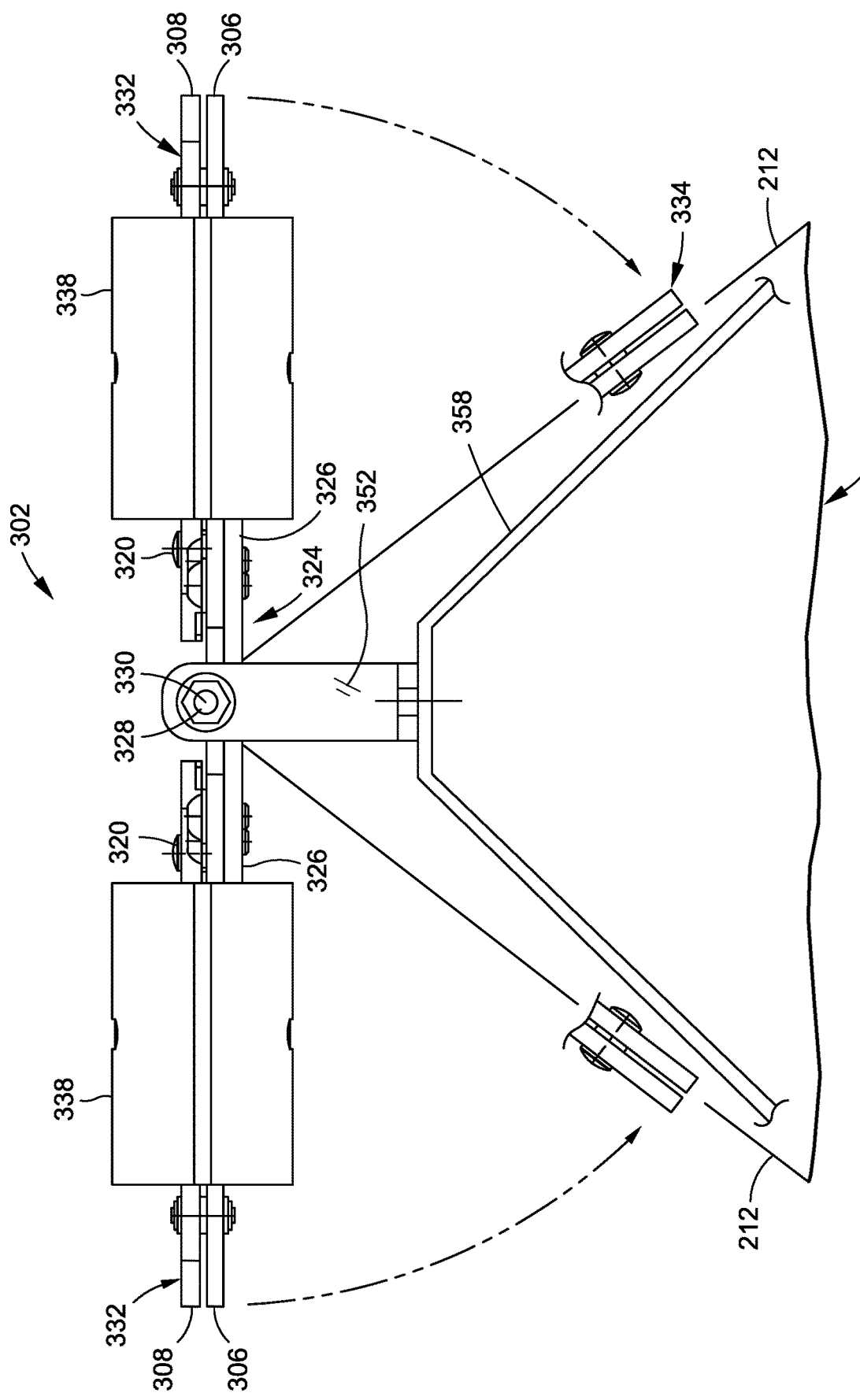
FIG. 15 is an end view of the upstream hinge clamp in the approximately flat configuration and showing in phantom lines the pivotability of the upstream hinge clamp into an angled configuration.

Referring to FIGS. 14-15, shown is an example of the coupling of the upstream hinge clamp 302 to the mandrel upstream end 214 by the above-mentioned hinge mounting bracket 358. Although the hinge mounting bracket 358 is shown mounted directly to the mandrel upstream end 214, the hinge mounting bracket 358 may be attached to a fixture (not shown) that may support the forming mandrel 202. The upstream hinge clamp 302 may include a upstream hinge support 352 coupled to the hinge pin 328 and mountable relative to the forming mandrel 202. In the example shown, the upstream hinge support 352 of the upstream hinge clamp 302 comprises a U-shaped bracket having opposing ends that are respectively coupled to opposing ends of the hinge 324. In this regard, the hinge pin 328 extends through the opposing ends of the U-shaped bracket. The lower portion of the U-shaped bracket may be attached to the hinge mounting bracket 358 such as by mechanical fastening, welding, or any other suitable attachment means. The upstream hinge support 352 is configured and mounted to the hinge mounting bracket 358 in a manner that avoids interfering with the pivoting of the opposing lateral sides of the upstream hinge clamp 302 from the approximately flat configuration 332 (shown in solid lines in FIG. 15) to the angled configuration 334 (shown in phantom lines in FIG. 15). The upstream hinge clamp 302 is configured and positioned relative to the forming mandrel 202 such that when the upstream hinge clamp 302 is in the approximately flat configuration 332, the composite charge 500 at the mandrel upstream end 214 is no higher that the mandrel top portion 204, and is preferably slightly (e.g., no more than 13 mm) below the mandrel top portion 204. In this manner, the composite charge 500 is in contact with the mandrel top portion 204 whether the composite charge 500 is in the approximately flat configuration 332 or in the angled configuration 334.

FIG. 16 is a top view of an example of the downstream hinge clamp 304 for holding the composite charge 500 in position relative to the mandrel downstream end 216. The downstream hinge clamp 304 is configured similar to the above-describe upstream hinge clamp 302. For example, the downstream hinge clamp 304 includes a side-by-side pair of lower plates 306 each coupled to a hinge half 326. A pair of upper plates 308 are mountable respectively over the pair of lower plates 306 and may be aligned with one another using one or more plate alignment elements 318 such as the above-described alignment pins 320. The downstream hinge clamp 304 additionally includes a pair of clamping devices 338 such as the above-described spring clamp 340 illustrated in FIGS. 10-13, and which are respectively mountable over the pair of upper plates 308 and lower plates 306 for respectively clamping the charge downstream end 508 between the upper plates 308 and lower plates 306.

Figure 17:
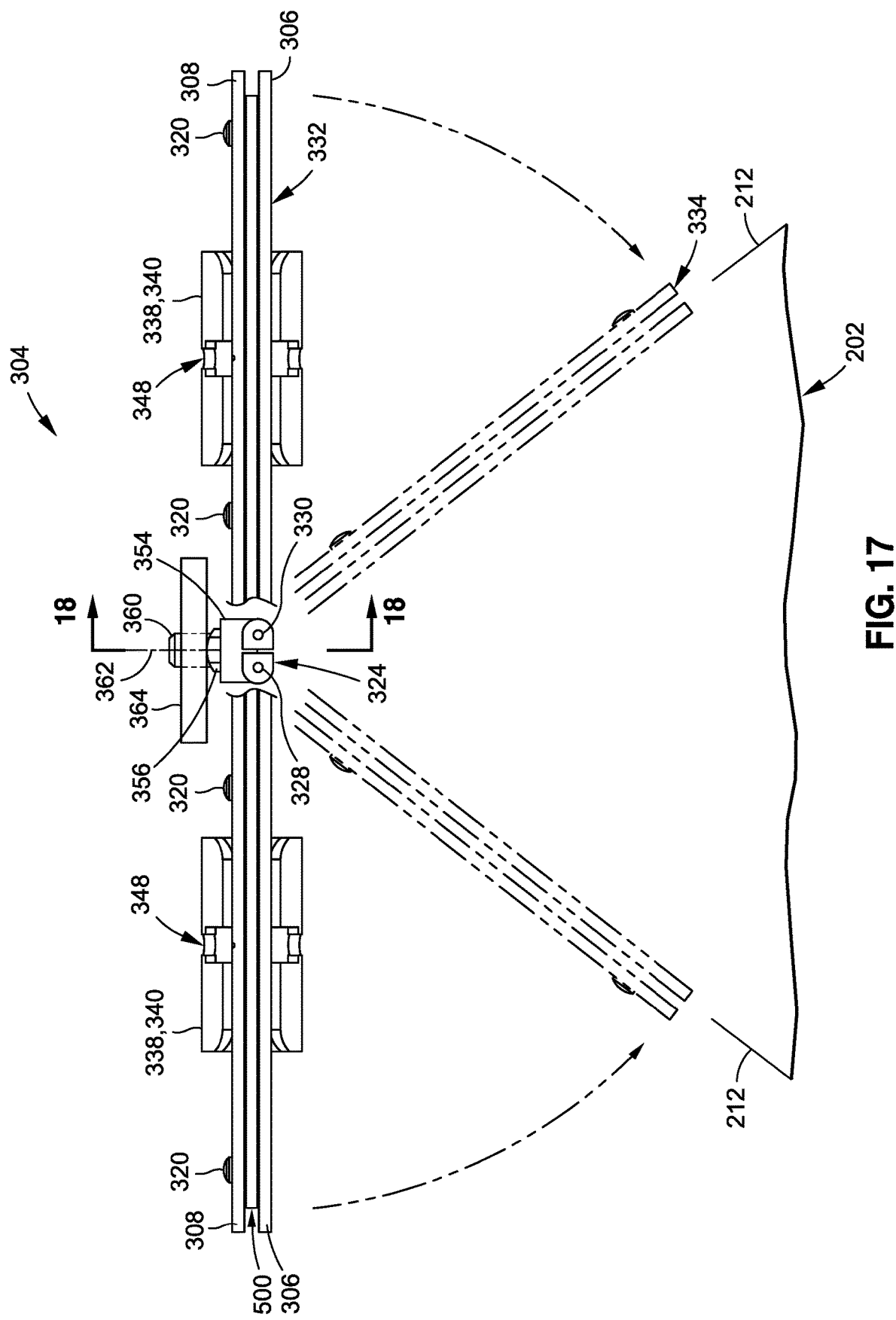
FIG. 17 is an end view of the downstream hinge clamp in the approximately flat configuration and showing in phantom lines the pivotability of the downstream hinge clamp into the angled configuration.

Referring to FIG. 16-17, the downstream hinge clamp 304 has a parallel pair of hinge pins 328 with corresponding hinge axes 330 about which the hinge halves 326 are respectively pivotable as the hinge 324 transitions from the approximately flat configuration 332 (shown in solid lines in FIG. 17) to the angled configuration 334 (shown in phantom lines in FIG. 17). The downstream hinge clamp 304 may include a downstream hinge support 354 coupled to the hinge pins 328 and mountable relative to the forming mandrel 202. In the example shown, the downstream hinge support 354 comprises an inverted U-shaped bracket having opposing ends that are respectively coupled to opposing ends of the hinge 324. The parallel pair of hinge pins 328 each extend through the opposing ends of the inverted U-shaped bracket. The upper portion of the inverted U-shaped bracket is attached to the forward extension element 364 via mechanical fasteners. A pair of spacers 356 are sandwiched between the upper portion of the inverted U-shaped bracket and the forward extension element 364. The spacers 356 may be beveled at the location with the spacers 356 physically contact the forward extension element 364. By configuring the downstream hinge clamp 304 with a pair of parallel hinge axis 330 instead of the single hinge axis 330 of the upstream hinge clamp 302, the forward extension element 364 may maintain the approximately flat portion of the composite charge 500 in a relatively level or horizontal orientation as the blanket assembly 400 is translated toward the mandrel downstream end 216.

Referring to FIG. 16-18, the downstream hinge clamp 304 may be pivotably coupled to the charge tensioning mechanism 458 (FIG. 8). For example, the downstream hinge support 354 of the downstream hinge clamp 304 may include a pivot pin 360 having a pivot axis 362 oriented approximately perpendicular (e.g., vertically oriented) to the hinge axis 330. The pivot pin 360 pivotably couples the downstream hinge support 354 to the forward extension element 364 which is coupled to the charge tensioning mechanism 458. As shown in FIG. 8, the charge tensioning mechanism 458 may be configured as an overhead gantry (not shown) or a robotic device 368 having an end effector 370 configured to grasp the downstream end of the forward extension element 364 and apply lengthwise tension 460

(FIG. 8) to the composite charge 500 Advantageously, the pivotable connection of the downstream hinge clamp 304 to the forward extension element 364 allows the downstream hinge clamp 304 to pivot to accommodate changes in the angular orientation of the charge downstream end 508 as the blanket assembly 400 approaches the mandrel downstream end 216. The ability of the downstream hinge clamp 304 to pivot about the vertical pivot axis 362 ensures that the lengthwise tension 460 remains oriented parallel to the lengthwise direction of the composite charge 500, thereby avoiding torqueing of the composite charge 500 which may undesirably result in wrinkling of the composite charge 500 due to the non-uniform distribution of lengthwise tension 460 across the lateral width of the composite charge 500.

Referring to FIGS. 8 and 16-19, as mentioned above, the charge tensioning mechanism 458 includes the capability for laterally steering the composite charge 500 so that the charge centerline 502 remains centered on the mandrel centerline 210 (FIG. 4) as the composite charge 500 is progressively formed onto the forming mandrel 202 during translation of the blanket assembly 400 along the lengthwise direction of the forming mandrel 202. The capability for laterally steering the composite charge 500 may advantageously allow the composite charge 500 to be formed over a non-straight forming mandrel 202 (not shown) while lengthwise tension 460 (FIG. 8) is constantly applied to the composite charge 500. In this regard, the charge tensioning mechanism 458 may function as a charge steering mechanism for maintaining the composite charge 500 centered relative to the mandrel centerline 210 despite any curvature or deviations from a straight-line shape of the forming mandrel 202 when viewed from a top-down direction. Advantageously, the ability of the upstream hinge clamp 302 and the downstream hinge clamp 304 to pivot from an approximately flat configuration 332 (FIG. 3) to an angled configuration 334 (FIG. 3) allows the lengthwise tension 460 to be continuously applied to the composite charge 500 while the composite charge 500 is progressively conformed to the cross-sectional shape of the forming mandrel 202.

Referring to FIGS. 19-25, the configuration of the wedge elements 436 also reduces or prevents the occurrence of wrinkling or buckling of composite plies 504 along the inside corners of the composite charge 500 by maintaining the opposing laterally outboard portions 516 of the composite charge 500 in a horizontal orientation as the composite charge 500 passes over the tapered sections 442 of the wedge elements 436. Along each tapered section 442, the wedge element top side 438 is downwardly inclined or sloped relative to the mandrel top portion 204 when the forming mandrel 202 is viewed from the side as shown in FIG. 19. As the composite charge 500 passes over the tapered sections 442, the composite charge 500 transitions from the approximately flat configuration 332 (FIGS. 19-20) to the angled configuration 334 (FIGS. 24-25), as described in greater detail below. Also shown in FIG. 19 is an inverted V-shaped forming plate 464 that may optionally be mounted on the blanket aft extension 420 at a location aft of the forming device 450. The forming plate 464 may further conform the composite charge 500 into the cross-sectional shape of the forming mandrel 202.

Figure 20:
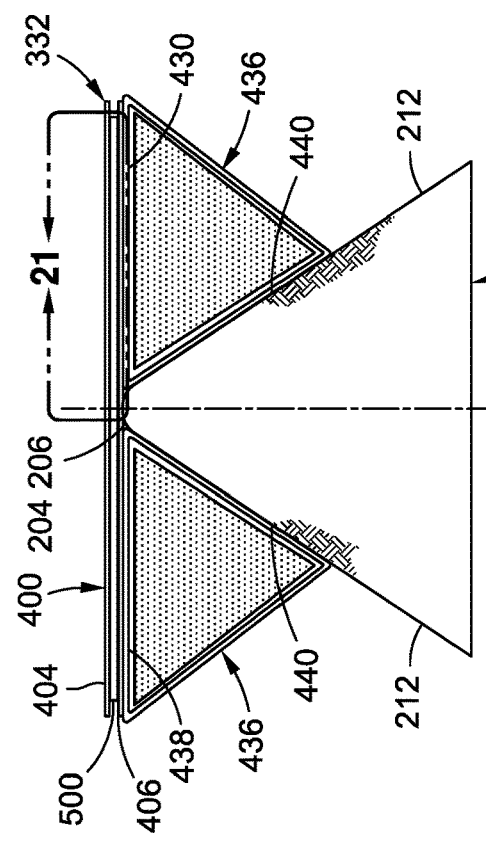
FIG. 20 is a sectional view of the forming system taken along line 20 of FIG. 19 and illustrating the approximately flat configuration of the blanket assembly and composite charge, and which are supported by a forward section of a pair of wedge elements of the blanket assembly.

FIG. 20 is a sectional view of the forming system 200 of FIG. 19 showing the composite charge 500 supported on the forming mandrel 202 by the forward sections 444 (FIG. 19) of the pair of wedge elements 436. The composite charge 500 initially has an approximately flat configuration 332. The forming mandrel 202 has a level tangent 208 to the apex 206 interconnecting the mandrel side surfaces 212. In the example shown, the level tangent 208 is oriented horizontally.

Figure 21:
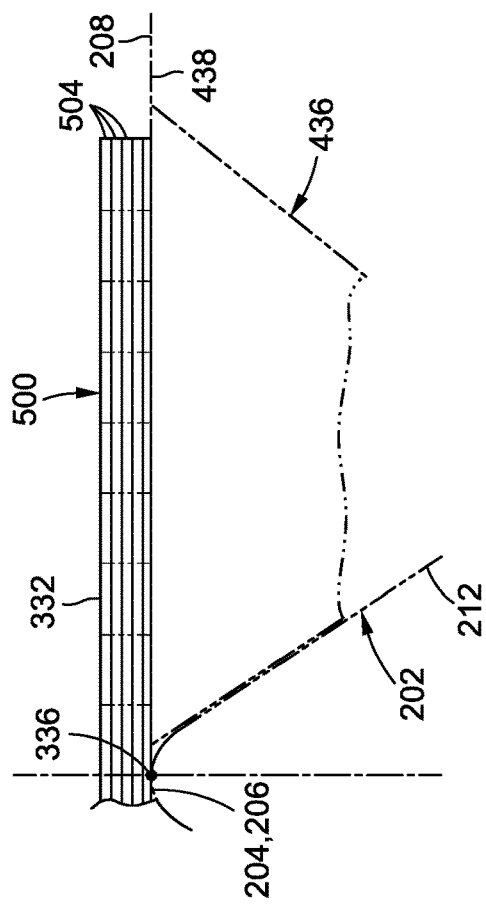
FIG. 21 is a magnified sectional view of one lateral side of the composite charge taken along line 21 of FIG. 20 (blanket assembly omitted for clarity) and illustrating the initially approximately flat configuration of the composite charge.

FIG. 21 is a magnified view of one lateral side of the composite charge 500 of FIG. 20 in the initially approximately flat configuration 332. The blanket assembly 400 including the wedge elements 436 are omitted for clarity. The composite charge 500 is comprised of a plurality of composite plies 504. Also shown in FIG. 21 are a series of vertical phantom lines that are equally spaced apart from one another for illustrating the slipping of the composite plies relative to one another within the slipping zone 512 (FIG. 23).

FIG. 22 is a sectional view of the forming system 200 of FIG. 19 showing the formation of a Z-shaped contour 510 in each of laterally opposite sides of the composite charge 500. The composite charge 500 is generally formed into the Z-shaped contours 510 as a result of the blanket forming pressure 424 applied on the composite charge 500 by the upper heating blanket 404 and optional mass element 426 (FIGS. 3-4). However, as indicated above, the forming devices forms the composite charge 500 into the shape of the forming mandrel 202. In FIG. 22, each Z-shaped contour 510 has a laterally-outwardly-moving slipping zone 512 (FIG. 23) located along the juncture of each mandrel side surface 212 with a wedge element top side 438 (e.g., along the diagonal notch 422—FIG. 3).

FIG. 23 is a magnified view of one lateral side of the composite charge 500 of FIG. 22 showing the showing Z-shaped contour 510 of the composite plies 504, and wherein the blanket assembly 400 and wedge elements 436 are omitted for clarity. The blanket forming pressure 424 causes the composite plies 504 to interlaminarly slip relative to one another within the slipping zone 512, facilitated by a reduction in resin viscosity due to heating of the composite charge 500 by the upper heating blanket 404 and/or below heating blanket. As mentioned above, the reduction in resin viscosity reduces interlaminar friction between composite plies 504 which facilitates interlaminar slipping of the composite plies 504 relative to one another. As can be seen, the formerly vertical phantom lines (FIG. 21) within the slipping zone 512 are now non-vertically oriented (FIG. 23). A non-slipping zone 514 occurs on each side of the slipping zone 512. Within the non-slipping zones 514, the composite plies 504 are stationary or non-slipping relative to one another. The laterally outboard portion 516 of the composite charge 500 is a non-slipping zone 514. The inclined portion of the composite charge 500 is also a non-slipping zone 514 and a previous slipping zone.

Advantageously, the wedge element top sides 438 support the laterally outboard portions 516 of the composite charge 500 in approximately parallel relation (e.g., approximately horizontal) to the level tangent 208 (e.g., also horizontal) to the apex 206 of the forming mandrel 202, which prevents the slipping of composite plies 504 within the laterally outboard portion 516, and maintains the slipping zone 512 at a relatively narrow width. Maintaining the slipping zone 512 in a relatively narrow lateral width reduces the amount of interlaminar shear that would otherwise occur between adjacent composite plies 504 if each lateral side of the composite charge 500 were formed against the mandrel side surface 212 on one time. Advantageously, the reduction in interlaminar shear allows the composite plies 504 to slip relative to one another in a way that reduces or minimizes the build-up of compressive forces in the composite plies 504, thereby preventing the occurrence of localized wrinkling or buckling of the composite plies 504 which may otherwise reduce the strength and/or stiffness of the composite charge when cured.

FIG. 24 is a sectional view of the forming system 200 of FIG. 19 showing each side of the composite charge 500 conformed to the forming mandrel 202 at a location aft of the wedge elements 436. The sectional is taken within the blanket aft extension 420 which is optionally included with the blanket assembly 400.

FIG. 25 is a magnified sectional view of the composite charge 500 of FIG. 26 showing the composite charge 500 conformed to the mandrel side surface 212 of the forming mandrel 202. The blanket assembly 400 including the upper heating blanket 404 and lower heating blanket 406 have been omitted for clarity. The illustrations in FIGS. 20-25 show the sequence of conforming the composite charge 500 to the forming mandrel 202 without the formation of wrinkles, creases, and/or buckles along the inside corners of the composite charge 500 which would otherwise occur if the composite charge 500 were formed by folding the opposing lateral sides of the composite charge 500 over the forming mandrel 202 at one time.

Referring now to FIG. 26 with additional reference to FIGS. 27-32, shown is a flowchart having one or more operations included in a method 600 of forming a composite charge 500 onto a forming mandrel 202 using the presently-disclosed upstream hinge clamp 302 and downstream hinge clamp 304 for respectively holding the composite charge 500 in position relative to the mandrel upstream end 214 and mandrel downstream end 216. The method initially includes mounting the lower heating blanket 406 on the forming mandrel 202, and positioning a pair of wedge elements 436 respectively between the opposing mandrel sides and the underside of the lower heating blanket 406. The method additionally includes positioning the composite charge 500 over the lower heating blanket 406 such that opposing ends 506, 508 of the composite charge 500 respectively extend at least to the mandrel upstream end 214 and the mandrel downstream end 216 of the forming mandrel 202.

Step 602 of the method 600 includes clamping at least one of opposing ends 506, 508 of the composite charge 500 to a hinge clamp 302, 304 located at one of the mandrel ends 214, 216. For example, the method includes clamping the charge upstream end 506 to the upstream hinge clamp 302 for holding the charge upstream end 506 in position relative to the mandrel upstream end 214, and clamping the charge downstream end 508 to the downstream hinge clamp 304 for holding the charge downstream end 508 in position relative to the mandrel downstream end 216. As described above and illustrated in the figures, the upstream hinge clamp 302 may be coupled to the mandrel upstream end 214 using a hinge mounting bracket 358 as shown in FIGS. 7 and 14 and described above. The downstream hinge clamp 304 may be coupled to the charge tensioning mechanism 458 via the forward extension element 364 as shown in FIGS. 8 and 18 and described above. The composite charge 500 and therefore the upstream hinge clamp 302 initially have an approximately flat configuration 332.

Referring briefly to FIGS. 9-17, the charge upstream end 506 and the charge downstream end 508 may be respectively clamped to the upstream hinge clamp 302 and downstream hinge clamp 304 by positioning the end of the composite charge 500 over the pair of lower plates 306 as shown in FIGS. 7 and 16. A pair of upper plates 308 may be respectively mounted over the pair of lower plates 306 with the composite charge 500 sandwiched therebetween. The method may include aligning, using one or more plate alignment elements 318, each one of the upper plates 308 with a corresponding one of the lower plates 306 as shown in FIG. 10. In the example shown, the plate alignment elements 318 may be a pair of alignment pins 320 fixedly mounted to the upper plate 308 or to the lower plate 306. The alignment pins 320 may be configured to be slidably received in a corresponding pair of clearance holes formed in the upper plate 308 and the lower plate 306. Gripping of the composite charge 500 may be facilitated by mechanical gripping elements 316 (serrations, depressions, protuberances, grooves, ridges, etc.) that may be included on the inner clamping surfaces 314 of the upper plates 308 and/or lower plates 306.

Referring briefly to FIGS. 10-13, the method may include installing a pair of clamping devices 338 respectively over the pair of upper plates 308 and lower plates 306 on opposing lateral sides of the composite charge 500. For example, the method may include mounting a one-piece spring clamp 340 over each one of the upper plates 308 and lower plates 306. As shown in FIG. 12, the spring clamp 340 has opposing free ends 342 which are spread apart to provide an opening in the spring clamp 340 large enough for passing the spring clamp 340 over the upper plate 308 and lower plate 306 with the composite charge 500 clamped therebetween, after which the free ends 342 are released onto the upper plate 308 and lower plate 306, causing the spring clamp 340 to exert a plate clamping force 344 which is distributed by the upper plate 308 and the lower plate 306 onto the composite charge 500 as shown in FIG. 13. The method may include aligning a spring clamp alignment feature 346 of the spring clamp 340 with a spring camp alignment feature 346 of the upper plate 308 and/or the lower plate 306. For example, the method may include aligning a notch 348 (FIGS. 9 and 16) formed in the free ends 342 of the spring clamp 340 with a set of centering marks 350 (FIGS. 9 and 16) included in the upper plate 308 and/or the lower plate 306.

Referring to FIG. 27, with the composite charge 500 in the approximately flat configuration 332 and clamped to the upstream hinge clamp 302 and downstream hinge clamp 304, the method may include positioning the upper heating blanket 404 over the composite charge 500 such that the blanket forward end 408 is approximately aligned with the blanket forward end 408 of the lower heating blanket 406. The method may additionally include applying heat 434 to the composite charge 500 using the upper heating blanket 404 and/or the lower heating blanket 406 to reduce the viscosity of resin in the composite charge 500 to facilitate forming of the composite charge 500 over the forming mandrel 202. The method may include lowering, using a robotic device 368 (FIG. 8), a forming device 450 such as a rollable element 454 onto the blanket assembly 400 at the forward end of the tapered sections 442.

FIG. 28 illustrates the rollable element 454 being rolled (e.g., by the robotic device 368) along an upstream direction of the forming mandrel 202 over the portion of the blanket assembly 400 and composite charge 500 covering the tapered sections 442 as a means to progressively conform such portion of the composite charge 500 to the cross-sectional shape of the forming mandrel 202. The rolling of the rollable element 454 over the tapered sections 442 and the blanket forming pressure 424 applied by the upper heating blanket 404 induces a Z-shaped contour 510 (FIGS. 22-23) in the laterally opposite sides of the composite charge 500 as the composite charge 500 is progressively conformed to the cross-sectional shape of the forming mandrel 202 without the occurrence of wrinkles in the inside corners of the composite charge 500, as described above. The rollable element 454 may be rolled onto the blanket aft extension 420, after which the rollable element 454 is held stationary relative to the blanket assembly 400. As shown in FIG. 9, the upstream hinge clamp 302 and the composite charge 500 advantageously transition from the approximately flat configuration 332 to the angle configuration as the rollable element 454 (FIG. 28) progressively conforms (FIGS. 20-23) the upstream section of the composite charge 500 to the cross-sectional shape (FIGS. 24-25) of the forming mandrel 202.

Referring to FIGS. 29-31, the method includes translating the blanket assembly 400 and forming device 450 as a unit along the lengthwise direction of the forming mandrel 202 with the composite charge 500 sliding therethrough from the blanket forward end 408 to the blanket aft end 410. Translation of the blanket assembly 400 may be performed by engaging and pulling, using a robotic device 368 (FIG. 8), the pair of rigid elements 414 respectively coupled to the upper heating blanket 404 and the lower heating blanket 406 at the blanket forward end 408. The method includes exerting, using the upper heating blanket 404, a blanket forming pressure 424 on the composite charge 500 as the blanket assembly 400 and forming device 450 are translated along the forming mandrel 202. During translation of the blanket assembly 400 and forming device 450, the rigid elements 414 of the upper heating blanket 404 and the lower heating blanket 406 may be urged toward each other to generate the above-described blanket entrance clamping pressure 418 on the composite charge 500. The step of urging the rigid elements 414 toward each other may include using spring mechanisms 416 (FIG. 19) such as clamping springs coupled to the rigid elements 414. With the blanket entrance clamping pressure 418 applied to the composite charge 500, lengthwise tension 460 (FIG. 8) is applied to the section of the composite charge 500 located between the blanket forward end 408 and forming device 450 when the blanket assembly 400 is translated along the forming mandrel 202. As described above, the lengthwise tension 460 reduces or prevents the formation of wrinkles and/or creases that would otherwise occur in the composite charge 500 as the composite charge 500 passes over the tapered sections 442.

Step 604 of the method 600 includes forming the composite charge 500 onto the forming mandrel 202 as the composite charge 500 slides between the upper heating blanket 404 and lower heating blanket 406 during translation of the blanket assembly 400. Referring to FIGS. 22-23, the method includes inducing in each of laterally opposite sides of the composite charge 500 a Z-shaped contour 510 having a laterally-outwardly-moving slipping zone 512 located along a juncture of each mandrel side surface 212 with a wedge element top side 438, and within which the composite plies 504 interlaminarly slip relative to one another with reduced interlaminar friction, facilitated by reduced resin viscosity in the composite charge 500 from heating. The method includes supporting the laterally outboard portions 516 of the Z-shaped contour 510 on each laterally opposite side of the composite charge 500 in approximately parallel (e.g., horizontal) relation to a level tangent 208 (e.g., also horizontal) to the mandrel top portion 204 as the composite charge 500 slides between the upper heating blanket 404 and lower heating blanket 406. The method additionally includes forming the composite charge 500 against the forming mandrel 202 (e.g., against mandrel side surfaces 212) using the forming device 450 (and optional forming plate 464—FIG. 19) mounted on the blanket assembly 400 aft of the tapered section 442, as described above.

Step 606 of the method 600 includes folding the hinge clamps 302, 304 from the approximately flat configuration 332 to an angled configuration 334 during forming of the composite charge 500 onto the forming mandrel 202. For example, the upstream hinge clamp 302 pivots about the hinge axis 330 (FIGS. 9 and 15) as the upstream hinge clamp 302 and composite charge 500 transition from the approximately flat configuration 332 shown in FIG. 27 to the angled configuration 334 shown in FIG. 28 as a result of the rollable element 454 progressively conforming the upstream portion of the composite charge 500 to the cross-sectional shape of the forming mandrel 202 as the rollable element 454 rolls in an upstream direction over the tapered sections 442. Likewise, the downstream hinge clamp 304 pivots about the pair of hinge axes 330 (FIGS. 16-17) as the downstream hinge clamp 304 and composite charge 500 transition from the approximately flat configuration 332 shown in FIG. 30 to the angled configuration 334 shown in FIG. 31 as a result of translation of the blanket assembly 400 to the mandrel downstream end 216.

As mentioned above, the method includes coupling the downstream hinge clamp 304 to the charge tensioning mechanism 458 located at the charge downstream end 508, and applying, using the charge tensioning mechanism 458, lengthwise tension 460 (FIG. 8) to the composite charge 500 during the forming of the composite charge 500 to the cross-sectional shape of the forming mandrel 202. As indicated above, the charge tensioning mechanism 458 may be a robotic device 368 (FIG. 8), an overhead gantry (not shown), or other device for pulling on the forward extension element 364 (FIGS. 16-19 and 27-31) which extends longitudinally downwardly from the charge downstream end 508. In the example of FIG. 8, the robotic device 368 may include an end effector 370 that may be engaged to the forward extension element 364. The robotic device 368 may be configured to apply constant lengthwise tension 460 to the composite charge 500 as the forming device 450 is translated along the forming mandrel 202.

Referring briefly to FIGS. 8 and 16-19, as mentioned above, the downstream hinge clamp 304 may be pivotably coupled to the charge tensioning mechanism 458 by a pivot pin 360. In such an arrangement, the method may include steering the charge downstream end 508 in a lateral direction (FIG. 8) such that the charge centerline 502 (FIG. 3) is maintained in approximate alignment (e.g., within approximately 25 mm) with the mandrel centerline 210 (FIG. 4) as the blanket assembly 400 is translated from the mandrel upstream end 214 to the mandrel downstream end 216. The ability to laterally steer the composite charge 500 provides a means for accommodating curvature in the forming mandrel 202 (e.g., when viewed from a top-down direction) as the blanket assembly 400 is translated along the forming mandrel 202. Advantageously, the charge tensioning mechanism 458 may continuously apply lengthwise tension 460 (FIG. 8) to the charge downstream end 508 while laterally steering the composite charge 500.

FIG. 32 shows the removal of the blanket assembly 400 and the forming device 450 from the forming mandrel 202 after the blanket assembly 400 has been translated along the entire length of the forming mandrel 202. The entire length of the composite charge 500 is shown conformed to the cross-sectional shape of the forming mandrel 202, with the upstream hinge clamp 302 and the downstream hinge clamp 304 in the angled configuration 334. The charge upstream end 506 and the charge downstream end 508 may be unclamped from the upstream hinge clamp 302 and downstream hinge clamp 304 by removing the spring clamps 340

(FIGS. 10-13) and separating the upper plates 308 from the lower plates 306 (FIG. 10). The formed composite charge 500 may be removed from the forming mandrel 202 and cured. Alternatively, the formed composite charge 500 may be assembled with another composite charge 500 such as to form a T-shaped cross section (not shown) which may be cured and then co-bonded or co-cured with another composite part such as a composite skin.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A clamping system for securing a composite charge in position relative to a forming mandrel, the forming mandrel having opposing mandrel side surfaces interconnected by a mandrel top portion, comprising:
   an upstream hinge clamp and a downstream hinge clamp configured to be mounted proximate respectively a mandrel upstream end and a mandrel downstream end of a forming mandrel, and configured to respectively clamp and hold opposing ends of a composite charge in respective position relative to the mandrel upstream end and the mandrel downstream end of the forming mandrel during forming of the composite charge onto the forming mandrel;
   a charge tensioning device coupled to the downstream hinge clamp and configured to apply lengthwise tension in the composite charge during forming of the composite charge onto the forming mandrel;
   each one of the hinge clamps is configured to fold about at least one hinge axis from an approximately flat configuration to an angled configuration during forming of the composite charge onto the forming mandrel; and
   at least one of the upstream hinge clamp and the downstream hinge clamp is mountable proximate respectively the mandrel upstream end and the mandrel downstream end of the forming mandrel in a manner such that the hinge axis of at least one of the upstream and downstream hinge clamps is oriented approximately parallel to a folding axis of the composite charge and is located proximate an intersection of the mandrel top portion with at least one of the mandrel side surfaces.

2. The clamping system of claim 1 wherein:
   the upstream hinge clamp is configured to be fixedly coupled to the mandrel upstream end by a hinge mounting bracket configured to be mounted at a location immediately upstream of the mandrel upstream end.

3. The clamping system of claim 1 wherein the upstream hinge clamp and the downstream hinge clamp each include:
   a hinge having a pair of hinge halves pivotable about the at least one hinge axis;
   a pair of lower plates respectively coupled to the pair of hinge halves;
   a pair of upper plates respectively mountable over the pair of lower plates;
   a pair of clamping devices respectively configured to clamp the composite charge between the lower plates and the upper plates; and
   the pair of hinge halves configured to rotate about the at least one hinge axis to transition the composite charge from the approximately flat configuration to the angled configuration during forming of the composite charge onto the forming mandrel.

4. The clamping system of claim 3 wherein:
   at least one of the clamping devices is a spring clamp mountable over an upper plate and lower plate.

5. The clamping system of claim 4 wherein:
   the spring clamp includes a spring clamp alignment feature for centering the spring clamp on an upper plate and lower plate.

6. The clamping system of claim 4 wherein:
   the spring clamp has a C-shaped cross-section with opposing free ends; and
   at least one of the upper plate and the lower plate includes a groove formed in an exterior surface of the upper plate and the lower plate for engaging at least one of the free ends of the spring clamps.

7. The clamping system of claim 3 wherein:
   at least one of the upper plate and the lower plate has an inner clamping surface having mechanical gripping elements for gripping the composite charge.

8. The clamping system of claim 3 wherein:
   at least one of the upper plates and lower plates includes one or more plate alignment elements for holding the at least one of the upper plates in alignment with one of the lower plates.

9. The clamping system of claim 3 wherein the downstream hinge clamp further comprises:
   a downstream hinge support having opposing ends;
   a parallel pair of hinge axes defined by a corresponding parallel pair of hinge pins each extending through the opposing ends of the downstream hinge support; and
   the pair of hinge halves of the downstream hinge clamp configured to respectively pivot about the parallel pair of hinge axes as the downstream hinge clamp transitions from the approximately flat configuration to the angled configuration during forming of the composite charge onto the forming mandrel.

10. A forming system for forming a composite charge onto a forming mandrel, comprising:
    a forming mandrel having a mandrel upstream end, a mandrel downstream end, and opposing mandrel side surfaces interconnected by a mandrel top portion;
    an upstream hinge clamp and a downstream hinge clamp configured to respectively clamp and hold opposing ends of a composite charge in respective position relative to the mandrel upstream end and the mandrel downstream end during forming of the composite charge onto the forming mandrel;
    each one of the hinge clamps is configured to fold about at least one hinge axis for transitioning the hinge clamp and a corresponding end of the composite charge from an approximately flat configuration to an angled configuration during forming of the composite charge onto the forming mandrel;
    the upstream hinge clamp and the downstream hinge clamp being mounted relative to the forming mandrel in a manner to be foldable independent of each other; and
    the hinge axis of at least one of the hinge clamps is oriented approximately parallel to a folding axis of the composite charge, the folding axis located proximate an intersection of the mandrel top portion with at least one of the mandrel side surfaces.

11. The forming system of claim 10 wherein:
the upstream hinge clamp is fixedly coupled to the mandrel upstream end by a hinge mounting bracket.

12. The forming system of claim 10 wherein at least one of the upstream hinge clamp and the downstream hinge clamp includes:
a hinge having a pair of hinge halves pivotable about the at least one hinge axis;
a pair of lower plates respectively coupled to the pair of hinge halves;
a pair of upper plates respectively mountable over the pair of lower plates; and
a pair of clamping devices respectively configured to be mounted over the pair of upper plates and lower plates for clamping the composite charge therebetween.

13. The forming system of claim 10 wherein:
the downstream hinge clamp at the mandrel downstream end is pivotably coupled to a charge tensioning device configured to apply lengthwise tension in the composite charge during forming of the composite charge onto the forming mandrel.

14. The forming system of claim 13 wherein:
the downstream hinge clamp is pivotably coupled to the charge tensioning device in a manner allowing the charge tensioning device to laterally steer the composite charge while maintaining lengthwise tension in the composite charge.

15. A method of forming a composite charge onto a forming mandrel having a mandrel upstream end, a mandrel downstream end, and opposing mandrel side surfaces interconnected by a mandrel top portion, comprising:
clamping opposing ends of a composite charge respectively to an upstream hinge clamp and a downstream hinge clamp respectively located at the mandrel upstream end and the mandrel downstream end of the forming mandrel, the hinge axis of at least one of the upstream and downstream hinge clamps oriented approximately parallel to a folding axis of the composite charge, the folding axis located proximate an intersection of the mandrel top portion with at least one of the mandrel side surfaces;
forming the composite charge onto the forming mandrel; and
folding, independent of each other, each of the upstream and downstream hinge clamps about at least one hinge axis for transitioning the upstream and downstream hinge clamps and corresponding ends of the composite charge from an approximately flat configuration to an angled configuration during forming of the composite charge onto the forming mandrel.

16. The method of claim 15 wherein the step of forming the composite charge onto the forming mandrel comprises:
forming the composite charge onto the forming mandrel using a blanket assembly and a forming device, the blanket assembly having an upper heating blanket and a lower heating blanket through which the composite charge slides during translation of the blanket assembly along a lengthwise direction of the forming mandrel, the forming device positioned on a blanket aft extension and applying a forming device pressure onto the composite charge against mandrel side surfaces of the forming mandrel.

17. The method of claim 15 further including:
coupling the downstream hinge clamp to a charge tensioning device located at a downstream end of the composite charge; and
applying, using the charge tensioning device, lengthwise tension to the composite charge during folding of the downstream hinge clamp from the approximately flat configuration to the angled configuration.

18. The method of claim 17 wherein the downstream hinge clamp is pivotably coupled to the charge tensioning device by a pivot pin, the method further including:
laterally steering, using the charge tensioning device, the downstream end of the composite charge such that a charge centerline is maintained in alignment with a mandrel centerline during forming of the composite charge onto the forming mandrel.

19. The method of claim 15 wherein at least one of the upstream and downstream hinge clamps includes a hinge having a pair of hinge halves pivotable about a hinge axis oriented parallel to a folding axis located proximate an intersection of the mandrel top portion with at least one of the opposing mandrel side surfaces, a pair of lower plates respectively coupled to the pair of hinge halves, a pair of upper plates respectively mounted over the pair of lower plates, and a pair of clamping devices respectively configured to be mounted over the lower plates and upper plates, the step of clamping opposing ends of the composite charge to the upstream and downstream hinge clamps includes:
positioning an end of the composite charge over the pair of lower plates;
mounting a pair of upper plates respectively over the pair of lower plates with the composite charge positioned therebetween; and
installing a pair of clamping devices respectively over the pair of upper plates and lower plates.

20. The method of claim 19 wherein the step of installing a pair of clamping devices respectively over the pair of upper plates and lower plates includes:
mounting a pair of spring clamps respectively over the pair of upper plates and lower plates.

* * * * *